United States Patent
Li et al.

(10) Patent No.: US 9,749,230 B2
(45) Date of Patent: Aug. 29, 2017

(54) METHOD OF SENDING ADDRESS CORRESPONDENCE IN A SECOND LAYER PROTOCOL OF APPLYING LINK STATE ROUTING

(71) Applicant: Huawei Technologies Co., Ltd., Shenzhen (CN)

(72) Inventors: Yizhou Li, Shenzhen (CN); Jin Li, Shenzhen (CN)

(73) Assignee: Huawei Technologies Co., Ltd., Shenzhen (CN)

(*) Notice: Subject to any disclaimer, the term of this patent is extended or adjusted under 35 U.S.C. 154(b) by 559 days.

(21) Appl. No.: 13/788,514

(22) Filed: Mar. 7, 2013

(65) Prior Publication Data
US 2013/0294451 A1   Nov. 7, 2013

Related U.S. Application Data

(63) Continuation of application No. PCT/CN2011/074043, filed on May 13, 2011.

(30) Foreign Application Priority Data

Sep. 8, 2010 (CN) .......................... 2010 1 0275209

(51) Int. Cl.
*H04L 12/741* (2013.01)
*H04L 12/721* (2013.01)
(Continued)

(52) U.S. Cl.
CPC .............. *H04L 45/54* (2013.01); *H04L 45/66* (2013.01); *H04L 61/103* (2013.01);
(Continued)

(58) Field of Classification Search
CPC ....... H04L 45/54; H04L 45/66; H04L 61/103; H04L 61/6022; H04L 45/74; H04L 45/64
See application file for complete search history.

(56) References Cited

U.S. PATENT DOCUMENTS 7,398,322 B1   7/2008   Perlman
7,697,556 B2   4/2010   Gray
(Continued)

FOREIGN PATENT DOCUMENTS

CN   1809032 A   7/2006
CN   1968184 A   5/2007
(Continued)

OTHER PUBLICATIONS

Written Opinion of the International Searching Authority issued in corresponding PCT Patent Application No. PCT/CN2011/074043, mailed Aug. 18, 2011.
(Continued)

*Primary Examiner* — Marsha D. Banks Harold
*Assistant Examiner* — Anthony Luo
(74) *Attorney, Agent, or Firm* — Brinks Gilson & Lione

(57) ABSTRACT

The objective of the embodiments of the present invention is to provide a method and an apparatus of sending address correspondence information and updating a MAC table in a data link layer protocol of applying Link State Routing for solving the problem that too much bandwidth is occupied by broadcasting address correspondence information solicitation in a data link layer of applying link state routing. Through adopting the technical solution of the embodiments of the present invention, since besides the ingress network node, other network nodes also store address correspondence information in their address correspondence information tables, so when they receive an address correspondence information solicitation, they can directly reply with an address correspondence information response without broadcasting the solicitation, decreasing the bandwidth occupied by broadcasting address correspondence information solicitation in a data link layer of applying link state routing.

18 Claims, 5 Drawing Sheets

(51) Int. Cl.
*H04L 29/12* (2006.01)
*H04L 12/715* (2013.01)

(52) U.S. Cl.
CPC .......... *H04L 61/6022* (2013.01); *H04L 45/64* (2013.01); *H04L 45/74* (2013.01)

(56) References Cited

U.S. PATENT DOCUMENTS

| | | | |
|---|---|---|---|
| 7,826,453 B2 * | 11/2010 | Lin .............................. | 370/392 |
| 2002/0138628 A1 * | 9/2002 | Tingley et al. ............... | 709/227 |
| 2004/0255045 A1 * | 12/2004 | Lim et al. ..................... | 709/245 |
| 2008/0095160 A1 * | 4/2008 | Yadav et al. .................. | 370/390 |
| 2009/0037607 A1 * | 2/2009 | Farinacci et al. ............. | 709/249 |
| 2011/0123011 A1 * | 5/2011 | Manley et al. ........... | 379/201.02 |
| 2011/0194403 A1 * | 8/2011 | Sajassi ................. | H04L 12/462 370/217 |
| 2011/0235545 A1 * | 9/2011 | Subramanian et al. ...... | 370/254 |
| 2011/0299406 A1 * | 12/2011 | Vobbilisetty et al. ........ | 370/248 |

FOREIGN PATENT DOCUMENTS

| | | |
|---|---|---|
| CN | 101170478 A | 4/2008 |
| WO | WO 2010/004277 A1 | 1/2010 |

OTHER PUBLICATIONS

International Search Report issued in corresponding PCT Patent Application No. PCT/CN2011/074043, mailed Aug. 18, 2011.
Perlman et al., "RBridges: Base Protocol Specification" TRILL Internet Draft, Mar. 2007.
Perlman et al., "RBridges: Base Protocol Specification" TRILL Working Group Internet Draft, Mar. 3, 2010.
Touch et al., "Transparent Interconnection of Lots of Links (TRILL): Problem and Applicability Statement" Network Working Group, May 2009.
Cisco, FabricPath Configuration Guide, Cisco DCNM for LAN, Release 5.x, Feb. 2, 2012.
Extended European Search Report issued in corresponding European Patent Application No. 11823010.1, mailed May 17, 2013.
Eastlake et al., "TRILL Use of IS-IS" Network Working Group, Aug. 23, 2010.
Sofia, "A Survey of Advanced Ethernet Forwarding Approaches" IEEE Communications Surveys & Tutorials, vol. 11, No. 1, First Quarter 2009.
Perlman, "Challenges and Opportunities in the Design of TRILL: a Routed layer 2 Technology" IEEE 2009.
Perlman et al., "RBridges: Base Protocol Specification" TRILL Working Group, Mar. 3, 2010.
Eastlake et al., "RBridges: Use of IS-IS" Network Working Group, Nov. 3, 2008, 20 pages.

* cited by examiner

```
                    +-+-+-+-+-+-+-+-+-+-+-+-+-+-+-+-+
                    | V | R |M|Op-Length| Hop Count|
+-+-+-+-+-+-+-+-+-+-+-+-+-+-+-+-+-+-+-+-+-+-+-+-+-+-+-+-+-+-+-+-+
|    Egress RBridge Nickname    |   Ingress RBridge Nickname   |
+-+-+-+-+-+-+-+-+-+-+-+-+-+-+-+-+-+-+-+-+-+-+-+-+-+-+-+-+-+-+-+-+
|  Options...
+-+-+-+-+-+-+-+-+-+-+-+-
```

Fig.6

METHOD OF SENDING ADDRESS CORRESPONDENCE IN A SECOND LAYER PROTOCOL OF APPLYING LINK STATE ROUTING

CROSS-REFERENCE TO RELATED APPLICATIONS

The present application is a continuation of International Application No. PCT/CN2011/074043 filed on May 13, 2011, which claims priority to Chinese Patent Application No. 201010275209.0, filed in Chinese Patent Office on Sep. 8, 2010, both of which are hereby incorporated by reference in their entireties.

TECHNICAL FIELD

The present invention relates to network communication technologies, and particularly, to a method and an apparatus of sending address correspondence information and updating a MAC table in a data link layer protocol of applying Link State Routing.

BACKGROUND

Transparent Interconnect of Lots of Links (Transparent Interconnect of Lots of Links, TRILL) is a protocol applied to Routing Bridges (Routing Bridges or RBridges, RB). TRILL is executed in a Data Link Layer (Data Link Layer), i.e. layer 2 of an Open System Interconnection Reference Model (Open System Interconnection Reference Model). It mainly integrates the advantages of bridges (bridges) and Routers (Routers) and applies Link State Routing (Link State Routing) technique to a Date Link Layer, which does not interfere with the work of Routers in an upper layer. TRILL comes into being in order to substitute for the Spanning Tree Protocol (Spanning Tree Protocol, STP). Comparing with STP, TRILL improves the support of unicast and multicast in Multi-Pathing (Multi-Pathing) aspect and decreases delay.

Although Spanning Tree Protocol always plays a critical role in an Enterprise Network (Enterprise Network) in decades, it can not meet some requirements at present, such as live migration of a virtual machine, bandwidth intensive real-time media application and aggregating network structure by network center bridging.

Rbridges executes an Intermediate system to intermediate system (Intermediate system to intermediate system, IS-IS) protocol to broadcast connection information to all Rbridges. As a result, each Rbridges can know all of the other Rbridges and their relations of connection. In this way, Rbridges is given enough information to compute an optimal path of a unicast to any network node and distribution trees may be computed for a frame of unicast or multicast and for an unknown destination address.

An End Station Address Distribution Information (End Station Address Distribution Information, ESADI) protocol is an option of TRILL, which is used for the learning of a terminal address and distributing a terminal address information to a remote end, and which is realized through extending type-length-value (type-length-value, TLV) of IS-IS.

The message header of a TRILL message is shown in FIG. 6.

When a unicast message is sent, an RB which receives the message first is an ingress RB, which is responsible for performing TRILL encapsulation. The ingress RB searches, according to a destination Media Access Control (Media Access Control, MAC) address, a last RB on a forwarding path, which is called an egress RB. The ingress RB treats the nickname of the egress RB as Egress Rbridge Nickname (Egress Rbridge Nickname), treats its own nickname as Ingress RBridge Nickname (Ingress RBridge Nickname), and puts them in a TRILL header. Each of the Nicknames (Nicknames) is a dynamically designated 16 digits and is used as the abbreviation of IS-IS identification of RBridges so as to achieve the effect of compact coding. A protocol for dynamically obtaining a nickname is executed among all the RBs. For a multicast or broadcast message, an egress RB nickname represents a distribution tree and the nickname is the root of the distribution tree. Ingress RB is responsible for choosing which tree to perform a multicast or broadcast forwarding. Once receiving a message, an intermediate RB (not the ingress RB and the egress RB) determines a layer 2 address of a next-hop RB according to the egress RB, treats the layer 2 address as a destination address of an external layer 2 message header, treats its own layer 2 address as a source address of the external layer 2 message header, and descends the value of a Hop Count (Hop Count). Although the external layer 2 message header changes with each hop, the contents of the original message (i.e. the internal message) do not change.

Shortest Path Bridging (Shortest Path Bridging, SPB) provides a similar function as TRILL. It spreads and advertises topologies and relationships of members of logical network by using IS-IS based link state routing technique and provides logical Ethernet on the traditional Ethernet architecture.

The encapsulation method of MAC-in-MAC is applied to SPB to encapsulate a client Ethernet frame to an operator Ethernet frame.

As MAC-in-MAC adds a service instance tag (instance tag, I-Tag) field, operators may distribute Quality of Service (Quality of Service, QoS) parameters and define a unique identifier (instance service identifier, I-SID) for a user by using the field. As a result, a unique I-Tag can be distributed to the flow of each client, and QoS can be executed according to client rather than Virtual Local Area Network (Virtual Local Area Network, VLAN).

SPB establishes a shortest forwarding path through a layer 2 IS-IS protocol. Edge bridges are the interfaces between clients' network and service providers' network, which are similar as RB devices in the TRILL. When an Ethernet message arrives at an edge bridge from a user equipment, this kind of equipment encapsulates a client Ethernet frame with a mac-in-mac frame header and inserts a Backbone destination MAC address (Backbone destination MAC address, B-DA), a Backbone VLAN ID (VLAN ID) and an I-Tag of the edge bridge corresponding to an associated destination address. A switch in a backbone network is responsible for using a pre-defined routing to forward frames in a network according to a Backbone VLAN identifier (Backbone VLAN identifier, B-VID). Switches in the backbone network adopting SPB are different from traditional Ethernet switches is that they do not adopt a STP method.

Although TRILL and SPB use different encapsulating formats, both of them have similar uses and methods, and both of them apply link state routing to a data link layer protocol.

An Address Resolution Protocol (Address Resolution Protocol, ARP) realizes a function of getting a physical address of a device through an Internet Protocol (Internet Protocol, IP) address. Under an IP network environment, each host is assigned an IP address of 32 digits, and the IP address is a logical address of identifying a host in the range of network. In order to transmit a message in a physical network, a physical address of a destination host must be known, and in this way, there is an address transform problem of transferring an IP address to a physical address. Taking Ethernet environment as an example, in order to transmit a message to a destination host correctly, an IP address of 32 digits of the destination host must be transferred, according to address correspondence, into an address of Ethernet of 48 digits, i.e. MAC address. In this way, a group of services in a network layer is needed to transfer an IP address to a corresponding physical address, and this group of protocols is ARP protocol.

Because of the use of TRILL and SPB, a problem brought by using STP in the original layer 2 network is overcome, which makes a layer 2 network of a larger scale, i.e. large layer 2 network, become to be possible. However, large layer 2 network brings other new problems. Since the enlargement of a layer 2 network, the number of network nodes increase. If a traditional ARP protocol is still used, an ARP request of each host is broadcasted in VLAN, and in this way, flows of broadcasting messages occupy too much bandwidth. Additionally, since edge RBs, i.e. RBs which connect terminal devices, need to store MAC information of all terminal devices, their MAC tables can be huge.

SUMMARY

An objective of embodiments of the present invention is to provide a method and an apparatus of sending address correspondence information and updating MAC table in a data link layer protocol of applying Link State Routing, so as to solve the problem that too much bandwidth is occupied by broadcasting address correspondence information requests in a data link layer protocol of applying Link State Routing.

The objective of the embodiments of the present invention is realized through the following technical solution:

A method of sending address correspondence information in a data link layer protocol of applying Link State Routing, comprises:

receiving, by a network node, an address correspondence advertisement message on a local link;

obtaining first address correspondence information according to the address correspondence advertisement message, wherein the first address correspondence information comprises a correspondence between a Medium Access Control MAC address of a terminal device which sends the address correspondence advertisement message, an Internet Protocol IP address of the terminal device which sends the address correspondence advertisement message and a device identification of the network node;

recording the first address correspondence information in an address correspondence information table when the first address correspondence information is not in the address correspondence information table; and sending the first address correspondence information to other network nodes through a message of control plane, wherein the message of control plane makes the other network nodes record the first address correspondence information in their address correspondence information tables.

A method of updating Medium Access Control MAC table in a data link layer protocol of applying Link State Routing, comprising:

closing MAC address learning function of a network side;

receiving an address correspondence advertisement message, wherein encapsulation information of the address correspondence advertisement message comprises a device identification of a network node which encapsulates the address correspondence advertisement message;

obtaining first address correspondence information according to the address correspondence advertisement message, wherein the first address correspondence information comprises a correspondence between a Medium Access Control MAC address of a terminal device which sends the address correspondence advertisement message, an Internet Protocol IP address of the terminal device which sends the address correspondence advertisement message and the device identification in the address correspondence advertisement message;

adding the first address correspondence information to an address correspondence information table, when the IP address in the first address correspondence information is different from an IP address in any piece of address correspondence information in the address correspondence information table;

receiving an address correspondence information request message on a local link; and generating, when a target address in the address correspondence information request message is the same as an IP address in a piece of existing address correspondence information in the address correspondence information table, an address correspondence information response message corresponding to the existing address correspondence information, sending the address correspondence information response message corresponding to the existing address correspondence information to a terminal device which sends the address correspondence information request message, and updating a MAC table according to the existing address correspondence information.

A sending apparatus of address correspondence information in a data link layer protocol of applying Link State Routing, comprising:

a receiving unit for a network node receiving an address correspondence advertisement message on a local link;

an obtaining unit for obtaining first address correspondence information according to the address correspondence advertisement message, wherein the first address correspondence information comprises a correspondence between a Medium Access Control MAC address of a terminal device which sends the address correspondence advertisement message, an Internet Protocol IP address of the terminal device which sends the address correspondence advertisement message and a device identification of the network node;

a recording unit for recording the first address correspondence information in an address correspondence information table when the first address correspondence information is not in the address correspondence information table; and a sending unit for sending the first address correspondence information to other network nodes through a message of control plane, wherein the message of control plane makes the other network nodes record the first address correspondence information in their address correspondence information tables.

An updating apparatus of Medium Access Control MAC table in a data link layer protocol of applying Link State Routing, wherein MAC address learning function of a network side of the updating apparatus is in an inactive state, and the updating apparatus comprises:

a first receiving unit for receiving an address correspondence advertisement message, wherein encapsulation information of the address correspondence advertisement message comprises a device identification of a network node which encapsulates the address correspondence advertisement message;

an obtaining unit for obtaining first address correspondence information according to the address correspondence advertisement message, wherein the first address correspondence information comprises a correspondence between a Medium Access Control MAC address of a terminal device which sends the address correspondence advertisement message, an Internet Protocol IP address of the terminal device which sends the address correspondence advertisement message and the device identification in the address correspondence advertisement message;

an adding unit for adding the first address correspondence information to an address correspondence information table, when the IP address in the first address correspondence information is different from an IP address in any piece of address correspondence information in the address correspondence information table;

a second receiving unit for receiving an address correspondence information request message on a local link; and a generating unit for generating, when a target address in the address correspondence information request message is the same as an IP address in a piece of existing address correspondence information in the address correspondence information table, an address correspondence information response message corresponding to the existing address correspondence information, sending the address correspondence information response message corresponding to the existing address correspondence information to a terminal device which sends the address correspondence information request message, and updating a MAC table according to the existing address correspondence information.

Through adopting the technical solution of the embodiments of the present invention, since besides the ingress network node, other network nodes also store address correspondence information in their address correspondence information tables, they can directly reply with address correspondence information responses without broadcasting address correspondence information requests when receiving the address correspondence information requests, decreasing the bandwidth occupied by broadcasting address correspondence information requests in a data link layer of applying link state routing.

BRIEF DESCRIPTION OF DRAWINGS

To illustrate the technical solution of the embodiments of the present invention more clearly, a brief introduction of the accompanying drawings which are needed in the description of the embodiments or the prior art is given below. Apparently, the accompanying drawings in the description below is merely some of the embodiments of the present invention, based on which other drawings can be obtained by those of ordinary skill in the art without any inventive efforts.

FIG. 6 is a diagram of a message header of a TRILL message in prior art.

DESCRIPTION OF EMBODIMENTS

Specific implementation of the present invention is exemplified below through embodiments. Apparently, embodiments described below are only a part, but not all, of the embodiments of the present invention. All of the other embodiments obtained by those of ordinary skill in the art without any inventive efforts fall into the protection scope of the present invention.

An embodiment of the present invention is illustrated combined with FIG. 1 below.

Figure 1:
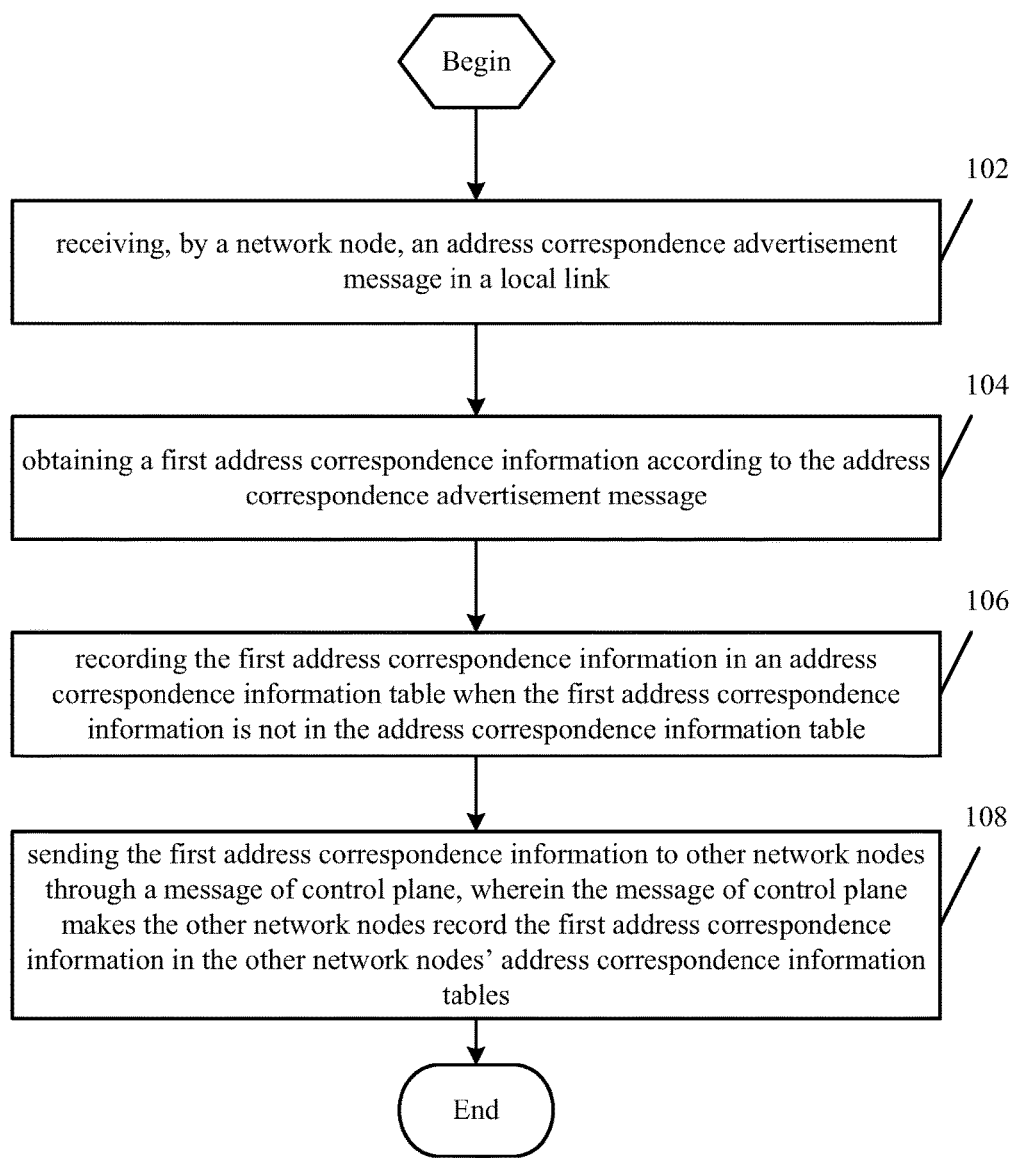
FIG. 1 is a flowchart of a method of sending address correspondence information in a data link layer protocol of applying Link State Routing in an embodiment of the present invention.

FIG. 1 is a flowchart of a method of sending address correspondence information in a data link layer protocol of applying Link State Routing in an embodiment of the present invention. The method comprises the following contents.

102. a network node receives an address correspondence advertisement message on a local link.

The data link layer protocol of applying link state routing may be TRILL, or it may also be Shortest Path Bridging.

In TRILL, the network node may be a routing bridge device which receives the address correspondence advertisement message. In SPB, the network node may be an edge bridge device which receives the address correspondence advertisement message.

In TRILL, the network node is an ingress RB of the address correspondence advertisement message, and it is also an ingress RB of other messages in a same VLAN which is sent by the terminal device that sends the address correspondence advertisement message, so it may be named as an ingress RB for short. In SPB, the network node is an ingress edge bridge device of the address correspondence advertisement message, and it is also an ingress RB of other messages in a same VLAN which is sent by a terminal device that sends the address correspondence advertisement message, so it may be named as an ingress edge bridge device for short. As a result, the network node may be generally named as an ingress network node.

The address correspondence advertisement message carries a MAC address and an IP address of the terminal device which sends the address correspondence advertisement message.

In Internet Protocol vision 6 (IPv6), the address correspondence advertisement message may be an unsolicited neighbor advertisement (unsolicited NA) message. A target address (Target Address) of the unsolicited NA message is an IP address of the terminal device sending the message, wherein the IP address may be a local IP address or a global IP address; a destination address is an all-nodes multicast address (all-nodes multicast address); a target Link-Layer Address (Target Link-Layer Address) is a Link-Layer Address of the terminal device sending the message, wherein the Link-Layer Address is a MAC address in an Ethernet; and a Solicited flag (Solicited flag) is set to zero.

In Internet protocol vision 4 (IPv4), the address correspondence advertisement message may be an ARP message. Specifically, the ARP message may be a gratuitous ARP (gratuitous ARP) message, it may also be a Reverse ARP (Reverse Address Resolution Protocol, RARP) message, or it may also be a broadcasted ARP reply (ARP Reply) message. The message type of the gratuitous ARP message is request, a sender address is an IP address of the terminal device sending the message, a sender MAC address is a MAC address of the terminal device sending the message, a target IP address is an IP address of the terminal device sending the message and a target MAC address is a broadcast address. The format of the broadcasted ARP Reply message is basically the same, but the message type is reply and a target IP address is a broadcast address. The message type of an RARP message is request and a sender IP address is a default value, such as all zero, so an IP address in first ARP information is also a default value.

When the network node receives the address correspondence advertisement message, it performs MAC address learning in a traditional way.

104. Obtain first address correspondence information according to the address correspondence advertisement message, wherein the first address correspondence information comprises a correspondence between a Medium Access Control MAC address of a terminal device which sends the address correspondence advertisement message, an Internet Protocol IP address of the terminal device which sends the address correspondence advertisement message and a device identification of the network node.

The first address correspondence information is a correspondence between a MAC address and an IP address of the terminal device sending the address correspondence advertisement message and a device identification of an ingress network node of the terminal device. The device identification of the ingress network node of the terminal device is a device identification of the network node receiving the address correspondence advertisement message. In IPv6, the first address correspondence information includes first neighbor cache information. In IPv4, the first address correspondence information includes first ARP information.

In TRILL, the device identification may use a nickname of a routing bridge device, or it may also directly use an IS-IS identification of a routing bridge device. In SPB, the device identification may be a B-MAC of an edge bridge device. When the network node records its own device identification, it may use a special identification, such as Local (Local), instead of the network node recording its own actual device identification in an address correspondence information table. Certainly, when the network node sends a message, it still uses its own actual device identification.

106. Record the first address correspondence information in an address correspondence information table when the first address correspondence information is not in the address correspondence information table.

The address correspondence information table is a table for storing address correspondence information in the network node. In IPv6, the address correspondence information table is a Neighbor Cache (Neighbor Cache) information table. In IPv4, the address correspondence information table is an ARP information table. Since the first address correspondence information further comprises the device identification of the ingress network node besides the MAC address and the IP address, compared with traditional neighbor cache and ARP tables, each item of the neighbor cache information table and the ARP information table adds contents of device identification. It is appreciated for those of ordinary skill in the art that the address correspondence information table may be an individual table, or it may also be consisted of a plurality of individual tables.

The first address correspondence information being not in the address correspondence information table means that at least one of the MAC address, the IP address or the device identification in the first address correspondence information is not in the address correspondence information table, i.e. at least one of the three is different from all of the items of the address correspondence information table.

In IPv6, when an IP address in the first neighbor cache information is different from an IP address in any piece of neighbor cache information in the neighbor cache information table, it may be assumed that a new terminal device is online or the terminal device changes its IP address. At this moment, the ingress network node adds the first neighbor cache information in the neighbor cache information table.

When the IP and MAC addresses in the first neighbor cache information are the same as IP and MAC addresses in a piece of existing neighbor cache information in the neighbor cache information table, and the device identification in the first neighbor cache information is different from a device identification in the existing neighbor cache information, it may be assumed that the terminal device which originally takes the other device as an ingress network node changes an access position, i.e. the terminal device makes a migration. At this moment, the ingress network node updates the existing neighbor cache information with the first neighbor cache information.

Since the terminal device has performed a duplicate address detection (duplicate address detection, DAD) before sending the unsolicited NA message, generally, there are not other types of duplicate address phenomenon except migration.

In IPv4, when the IP address in the first address correspondence information is not in the address correspondence information table, i.e. when the IP address in the first ARP information is different from an IP address in any piece of ARP information in the ARP information table, it may be assumed that a new terminal device is online or the terminal device changes an IP address. At this moment, the ingress network node adds the first ARP information to the ARP information table.

When the IP address in the first ARP information is the same as an IP address in a piece of existing ARP information in the ARP information table, the MAC address in the first ARP information is the same as a MAC address in the existing ARP information, and a device identification in the first ARP information, i.e. the ingress network node's own device identification, is different from a device identification in the existing ARP information, it may be assumed that the terminal device which originally takes the other device as an ingress network node changes an access position, i.e. the terminal device makes a migration. At this moment, the ingress network node updates the existing ARP information with the first ARP information. Since the ingress network node has performed MAC address learning, there is no need to check and update the MAC table at this moment.

When the terminal device is a virtual machine, a Hypervisor (Hypervisor) layer is only responsible for functioning as a virtual physical device, wherein a virtual network card and MAC generation is within its management scope, while an IP address is managed and assigned by a Guest OS (Guest OS), which has nothing to do with the hypervisor layer. If an ARP message which carries IP information is to be sent, the assistance of a Guest OS is needed, which need to explore corresponding tools for different types of operation systems. In order to simplify the complexity of the virtual machine, the virtual machine advertises a migration by an RARP message traditionally after the migration. At this moment, a sender IP address in the RARP message is a default value, such as all zero, so the IP address in first ARP information is also a default value. The RARP message is only used for advertising the migration and does not need to be replied.

As a result, when the IP address in the first ARP information is a default value, the MAC address in the first ARP information is the same as the MAC address in the existing ARP information, and the device identification in the first ARP information is different from the device identification in the existing ARP information, it may be assumed that a virtual machine migration is happened. At this moment, the ingress network node updates the device identification in the existing ARP information with the device identification in the first ARP information and replaces the IP address in the first ARP information with the IP address in the existing ARP information. At this moment, the IP address in first ARP information which is sent through a message of control plane, or in an ARP message which is TRILL encapsulated and sent in a form of unicast in TRILL, or in an ARP message which is encapsulated according to MAC-in-MAC and sent in a form of unicast in SPB, hereafter, is not a default value but the IP address in the first ARP information.

When the IP address in the first ARP information is the same as an IP address in a piece of existing ARP information in the ARP information table and the MAC address in the first ARP information is different from a MAC address in the existing ARP information, it may be assumed that an address conflict occurs or the terminal device changes a network card while still accessing with an original IP address. There are two choices at this moment: the first one is that the ingress network node updates the existing ARP information with the first ARP information. Optionally, the ARP message may be further encapsulated and be sent to a network node corresponding to the device identification in the existing ARP information in a form of unicast, wherein encapsulation information comprises the device identification in the first address correspondence information. The manner of encapsulating a message may be TRILL encapsulation or MAC-in-MAC encapsulation. The second one is that, under the case that the device identification in the first ARP information is different from the device identification in the existing ARP information, instead of updating the existing ARP information at first, the ingress network node encapsulates the ARP message and sends it to the network node corresponding to the device identification in the existing ARP information, wherein encapsulation information comprises the device identification in the first address correspondence information. The network node, i.e. the egress network node, de-encapsulates to obtain the ARP message and then broadcasts the ARP message on a local link corresponding to the ARP message encapsulated. A local link corresponding to the ARP message encapsulated means that when the ARP message is sent by the terminal device from a certain VLAN to the ingress network node, the egress network node broadcasts the ARP message on the VLAN of the local link. If the situation is caused by an address conflict, a terminal device which has an address conflict with the terminal device sending the ARP message responds with an ARP Reply message, otherwise, it indicates that the terminal device changes a network card while still accessing with an original IP address or the terminal device which has an address conflict is offline. Therefore, if an ARP response message which has the same IP address as that in the first ARP information is not received in a pre-determined time, the existing ARP information may be updated with the first ARP information. Under the case that the device identification of the first ARP information is the same as a device identification in a piece of existing ARP information, the ARP message is broadcasted on the local link corresponding to the ARP message, i.e. the ARP message is broadcasted on the VLAN receiving the ARP message. And if an ARP response message which has the same IP address as that in the first ARP information is not received in a pre-determined time, the existing ARP information is updated with the first ARP information.

When the first address correspondence information is in the address correspondence information table, a repeated ARP message might be received. The ARP message may be only broadcasted on a corresponding local link without being broadcasted on a network side, and there is no need to proceed to perform 108.

108. Send the first address correspondence information to other network nodes through a message of control plane, wherein the message of control plane makes the other network nodes record the first address correspondence information in their address correspondence information tables.

Since the message of control plane does not trigger the network node to perform MAC address learning, the MAC table of the edge network node is not increased. The message of control plane here means a date link layer advertisement message based on link state routing. In TRILL, the message of control plane may adopt an ESADI message, or adopt other messages of control plane which can spread address correspondence information. In SPB, the message of control plane may adopt a defined format based on IS-IS TLV, and the information at least comprises IP address and MAC address information in the first address correspondence information.

When receiving the first address correspondence information through a message of control plane, a network node records the first address correspondence information in its address correspondence information table. Since when the first address correspondence information is in the address correspondence information table of the ingress network node, the ingress network node does not spread the first address correspondence information, the first address correspondence information is certainly not in the address correspondence information table of the network node which receives the first address correspondence information through the message of control plane.

In IPv6, when an IP address in the first neighbor cache information is different from an IP address in any piece of neighbor cache information in the neighbor cache information table, the first neighbor cache information is added to the neighbor cache information table.

When IP and MAC addresses in the first neighbor cache information are the same as IP and MAC addresses in a piece of existing neighbor cache information in the neighbor cache information table, and a device identification in the existing neighbor cache information is different from a device identification of the network node, it may be assumed that the terminal device makes a migration and an ingress network node before the migration is not this network node. And when the MAC address in the existing neighbor cache information is different from a MAC address of any existing MAC item in a MAC table, the MAC address of the terminal device being not in the MAC table indicates that none of local terminal devices has communicated with the terminal device yet. The network node which receives the first address correspondence information through the message of control plane only needs to update the existing neighbor cache information with the first neighbor cache information.

When the IP and MAC addresses in the first neighbor cache information are the same as IP and MAC addresses in a piece of existing neighbor cache information in the neighbor cache information table, and a device identification in the existing neighbor cache information is different from the device identification of the network node, it may be assumed that the terminal device makes a migration and an ingress network node before the migration is not this network node. And when the MAC address in the existing neighbor cache information is the same as a MAC address of an existing MAC item in the MAC table, the MAC address of the terminal device being in the MAC table indicates that a local terminal device has communicated with the terminal device. The network node which receives the first address correspondence information through the message of control plane needs to update the existing neighbor cache information and the existing MAC item with the first neighbor cache information.

Since the terminal device performs a duplicate address detection before sending the unsolicited NA message, there are not other types of duplicate address phenomena except migration in general.

In IPv4, when an IP address in the first ARP information is different from an IP address in any piece of ARP information in the ARP information table, the network node which receives the first address correspondence information through the message of control plane adds the first ARP information to the ARP information table.

When the IP address in the first ARP information is the same as an IP address in a piece of existing ARP information in the ARP information table, a MAC address in the first ARP information is the same as a MAC address in the existing ARP information, and a device identification in the existing ARP information is different from the device identification of the network node which receives the first address correspondence information through the message of control plane, it may be assumed that the terminal device makes a migration and an ingress network node before the migration is not this network node. And when the MAC address in the existing ARP information is different from a MAC address of any existing MAC item in the MAC table, the MAC address of the terminal device being not in the MAC table indicates that none of local terminal devices has communicated with the terminal device yet. The network node which receives the first address correspondence information through the message of control plane only needs to update the existing ARP information with the first ARP information.

When the IP address in the first ARP information is the same as an IP address in a piece of existing ARP information in the ARP information table, the MAC address in the first ARP information is the same as a MAC address in the existing ARP information, and a device identification in the existing ARP information is different from the device identification of the network node which receives the first address correspondence information through the message of control plane, it may be assumed that the terminal device makes a migration and the ingress network node before the migration is not this network node. And when the MAC address in the existing ARP information is the same as a MAC address of an existing MAC item in the MAC table, the MAC address of the terminal device being in the MAC table indicates that a local terminal device has communicated with the terminal device. The network node which receives the first address correspondence information through the message of control plane needs to update the existing ARP information and the existing MAC item with the first ARP information. At this moment, there is no need to locally advertise that the terminal device makes a migration, since for a local terminal device, regardless of whether a non-local terminal device makes a migration or not, it only needs to send a message to the ingress network node when communicating with the non-local terminal device and subsequent processing is achieved by the ingress network node. And the local terminal device's information on the non-local terminal device which makes a migration, such as an IP address, a MAC address, a sending port and so on is not changed.

When the IP address in the first ARP information is the same as an IP address in a piece of existing ARP information in the ARP information table, the MAC address in the first ARP information is different from a MAC address in the existing ARP information, and the MAC address in the existing ARP information is different form a MAC address of any existing MAC item in the MAC table, the existing ARP information is updated with the first ARP information. Since none of local terminal devices has communicated with the terminal device yet, the network node which receives the first address correspondence information through the message of control plane only needs to update the ARP information table.

When the IP address in the first ARP information is the same as an IP address of a piece of existing ARP information in the ARP information table, the MAC address in the first ARP information is different from a MAC address in the existing ARP information, and the MAC address in the existing ARP information is the same as a MAC address of an existing MAC item in the MAC table, as a local terminal device has communicated with the terminal device, ARP information of the local terminal device is required to be updated. The network node which receives the first address correspondence information through the message of control plane updates the existing ARP information and the existing MAC item with the first ARP information, generates an ARP message corresponding to the first information and broadcasts the ARP message corresponding to the first ARP information on a local link corresponding to the message of control plane. Since the message of control plane carries all the information which is enough to reconstruct an original ARP message, the network node which receives the first address correspondence information through the message of control plane may generate an ARP message corresponding to the ARP message received by the ingress network node, such as a gratuitous ARP message or a broadcasted ARP Reply message. When the ARP message is sent by the terminal device from a certain VLAN to the ingress network node, the message of control plane includes information on the VLAN. The network node which receives the first address correspondence information through the message of control plane broadcasts the generated ARP message on the VLAN of a local link.

The above-mentioned solution is enough for the solution adopted in 106 which encapsulates and sends an ARP message, in a manner of unicast, to a network node corresponding to the device identification in the existing ARP information. However, if not adopting the solution that an ingress network node encapsulates and sends an ARP message, in a manner of unicast, to a network node corresponding to the device identification in the existing ARP information, a network node which receives the first address correspondence information through a message of control plane further needs to perform the following judgments and actions.

When the IP address in the first ARP information is the same as an IP address in a piece of existing ARP information in the ARP information table and a device identification in the existing ARP information is the same as the device identification of the network node, it indicates that a terminal device which might has an address conflict may be on a local link of the network node. Therefore, the network node needs to generate an ARP message corresponding to the first ARP information and to broadcast the ARP message corresponding to the first ARP information on a local link corresponding to the message of control plane. Since the message of control plane carries all the information which is enough to reconstruct an original ARP message, the network node which receives the first address correspondence information through the message of control plane may generate an ARP message corresponding to an ARP message received by the ingress network node, such as a gratuitous ARP message or a broadcasted ARP Reply message. When an ARP message is sent by the terminal device from a certain VLAN to the ingress network node, the message of control plane includes information on the VLAN. A network node which receives the first address correspondence information through the message of control plane broadcasts the generated ARP message on the VLAN of a local link.

If receiving second address correspondence information sent by another network node through a message of control plane, the network node record the second address correspondence information in its address correspondence information table. The second address correspondence information may be obtained, by the another network node, according to an address correspondence advertisement message received from a local link.

In IPv6, when an IP address in the second neighbor cache information is different from an IP address in any piece of neighbor cache information in the neighbor cache information table, the second neighbor cache information is added to the neighbor cache information table.

When IP and MAC addresses in the second neighbor cache information are the same as IP and MAC addresses in a piece of existing neighbor cache information in the neighbor cache information table, and a device identification in the existing neighbor cache information is different from a device identification of the network node, it may be assumed that the terminal device makes a migration and an ingress network node before the migration is not this network node. And when the MAC address in the existing neighbor cache information is different from a MAC address of any existing MAC item in a MAC table, the MAC address of the terminal device being not in the MAC table indicates that none of local terminal devices has communicated with the terminal device yet. The network node which receives the second address correspondence information through the message of control plane only needs to update the existing neighbor cache information with the second neighbor cache information.

When the IP and MAC addresses in the second neighbor cache information are the same as IP and MAC addresses in a piece of existing neighbor cache information in the neighbor cache information table, and a device identification in the existing neighbor cache information is different from the device identification of the network node, it may be assumed that the terminal device makes a migration and an ingress network node before the migration is not this network node. And when the MAC address in the existing neighbor cache information is the same as a MAC address of an existing MAC item in the MAC table, the MAC address of the terminal device being in the MAC table indicates that a local terminal device has communicated with the terminal device. The network node which receives the second address correspondence information through the message of control plane needs to update the existing neighbor cache information and the existing MAC item with the second neighbor cache information.

Since the terminal device performs a duplicate address detection before sending the unsolicited NA message, there are not other types of duplicate address phenomena except migration in general.

In IPv4, when an IP address in the second ARP information is different from an IP address in any piece of ARP information in the ARP information table, the network node adds the second ARP information to the ARP information table.

When the IP address in the second ARP information is the same as an IP address in a piece of existing ARP information in an ARP information table, a MAC address in the second ARP information is the same as a MAC address in the existing ARP information, and a device identification in the existing ARP information is different from the device identification of the network node, it may be assumed that a terminal device makes a migration and a network node before the migration is not this network node. And when the MAC address in the existing ARP information is different from a MAC address of any existing MAC item in the MAC table, the MAC address of the terminal device being not in the MAC table indicates that none of local terminal devices has communicated with the terminal device yet. The network node only needs to update the existing ARP information with the second ARP information.

When the IP address in the second ARP information is the same as an IP address in a piece of existing ARP information in the ARP information table, the MAC address in the second ARP information is the same as an MAC address in the existing ARP information, and a device identification in the existing ARP information is different from the device identification of the network node, it may be assumed that a terminal device makes a migration and a network node before the migration is not this network node. And when the MAC address in the existing ARP information is the same as a MAC address of an existing MAC item in the MAC table, the MAC address of the terminal device being in the MAC table indicates that a local terminal device has communicated with the terminal device. The network node needs to update the existing ARP information and the existing MAC item with the second ARP information. At this moment, there is no need to locally advertise that the terminal device makes a migration, since for a local terminal device, regardless of whether a non-local terminal device makes a migration or not, it only needs to send a message to the ingress network node when communicating with the non-local terminal and subsequent processing is achieved by the ingress network node. And the local terminal device's information on the non-local terminal device which makes a migration, such as an IP address, a MAC address, a sending port and so on is not changed.

When the IP address in the second ARP information is the same as an IP address in a piece of existing ARP information in the ARP information table, the MAC address in the second ARP information is different from a MAC address in the existing ARP information, and the MAC address in the existing ARP information is different from a MAC address of any existing MAC item in the MAC table, the existing ARP information is updated with the second ARP information. Since none of local terminal devices has communicated with the terminal device yet, the network node only needs to update the ARP information table.

When the IP address in the second ARP information is the same as an IP address in a piece of existing ARP information in the ARP information table, the MAC address in the second ARP information is different from a MAC address in the existing ARP information, and the MAC address in the existing ARP information is the same as a MAC address of any existing MAC item in the MAC table, as a local terminal device has communicated with the terminal device, ARP information of the local terminal device is required to be updated. The network node updates the existing ARP information and the existing MAC item with the second ARP information, generates an ARP message corresponding to the second information and broadcasts the ARP message corresponding to the second ARP information on a local link corresponding to the message of control plane. Since the message of control plane carries all the information which is enough to reconstruct an original ARP message, the network node may generate an ARP message corresponding to the ARP message received by the another network node, such as a gratuitous ARP message or a broadcasted ARP Reply message. When the ARP message is sent by the terminal device from a certain VLAN to the another network node, the message of control plane includes information on the VLAN and the network node broadcasts the generated ARP message on the VLAN of a local link.

The above-mentioned solution is enough for the solution of encapsulating and sending an ARP message, in a manner of unicast, to a network node corresponding to a device identification in existing ARP information. However, if not adopting the solution that another network node encapsulates and sends an ARP message, in a manner of unicast, to a network node corresponding to the device identification in the existing ARP information, the network node further needs to perform the following judgments and actions.

When the IP address in the second ARP information is the same as an IP address in a piece of existing ARP information in the ARP information table, and a device identification in the existing ARP information is the same as the device identification of the network node, it indicates that a terminal device which might has an address conflict may be on a local link of the network node, or an ingress network node of the terminal device before a migration is this network node. Therefore, the network node needs to generate an ARP message corresponding to the second ARP information, and to broadcast the ARP message corresponding to the second ARP information on a local link corresponding to the message of control plane. Since the message of control plane carries all the information which is enough to reconstruct an original ARP message, the network node may generate an ARP message corresponding to an ARP message received by another network node, such as a gratuitous ARP message or a broadcasted ARP Reply message. When an ARP message is sent by the terminal device from a certain VLAN to the another network node, the message of control plane includes information on the VLAN and the network node broadcasts the generated ARP message on the VLAN of a local link.

Since the message of control plane does not trigger MAC address learning, the network node needs to add a corresponding item in the MAC table at a proper time to ensure the correct forwarding of the message. When the network node receives an address correspondence information request message on a local link, if a target IP address in the address correspondence information request message is the same as an IP address in a piece of existing address correspondence information in the address correspondence information table, there is no need to forward the address correspondence information request message to a network side. A network node which has received the address correspondence information request message generates an address correspondence information response message corresponding to the existing address correspondence information, and sends the response message to a terminal device which sends the address correspondence information request message. Since the terminal device sending an address correspondence information request message means that the terminal device most likely needs to communicate with a requested terminal device next, at this moment, the network node updates a MAC table according to the existing address correspondence information. In a data link layer protocol of applying link state routing, a correspondence between a MAC address and a device identification of the network node is stored in an item of a MAC table of a network node corresponding to a network side, so it only needs to add the corresponding content in the item of the address correspondence information to the MAC table.

In IPv6, the address correspondence information request message includes a Neighbor Solicitation (Neighbor Solicitation, NS) message, and the address correspondence information response message includes a Neighbor Advertisement (Neighbor Advertisement, NA) message. A source address of the NS message is an IP address of a terminal device which sends the NS message, a destination address is a solicited-node multicast address (solicited-node multicast address) of a terminal device of which address correspondence information is solicited, and a target address is an IP address of a terminal device of which address correspondence information is solicited. A source address of the NA message is an IP address of existing neighbor cache information in a neighbor cache information table, a destination address is a source address of a corresponding NS message, a target address is a target address of a corresponding NS message, a target link layer address is a MAC address of existing neighbor cache information in the neighbor cache information table, and a solicited flag is set to 1.

In IPv4, the address correspondence information request message includes an ARP Request (ARP Request) message, and the address correspondence information response message includes an ARP Reply (ARP Reply) message. The message type of an ARP Request message is request, a sender address is an IP address of a terminal device sending the ARP Request message, and a target address is an IP address of a terminal device of which correspondence information is requested. The message type of an ARP Reply message is reply, a sender address is an IP address of existing ARP information in an ARP information table, a target address is a target address of a corresponding ARP Request message, and a target link layer address is a MAC address of existing ARP information in the ARP information table.

The ARP information table or the neighbor cache information table, which is generally controlled and accessed by a Central Processing Unit (Central Processing Unit, CPU), is stored in a memory with relatively slow access and lookup speed and without clear restriction to the specification, while the MAC table, which is generally controlled and accessed by an Application-specific integrated circuit (Application-specific integrated circuit, ASIC), a Field Programmable Gate Array (FPGA, Field Programmable Gate Array) or a Network processor (Network processor, NP), is stored in a Content-addressable memory (Content-addressable memory, CAM) with fast access and lookup speed, but with high cost and high power consumption as well as some restrictions to the specification.

Since the message of control plane does not make an edge network node learn MAC address and a device identification of an ingress network node is included in address correspondence information, a MAC table may be updated directly according to the existing address correspondence information when an address correspondence information request is received, thereby reducing a MAC table of the edge network node, and reducing the complexity of a device and lowering the requirements to the specifications of the MAC table while guaranteeing the correct forwarding of a message.

Optionally, the above-mentioned method may further comprise that the network node performs an aging detection on a terminal device on a local link. When it is needed to age address correspondence information of the terminal device, the network node ages the address correspondence information and may further delete a corresponding item in a MAC table. The network node sends, by a message of control plane, the address correspondence information of the terminal device to another network node. The another network node which receives the message of control plane ages the address correspondence information of the terminal device according to the indication of the message of control plane, and may further delete a corresponding item in a MAC table. A network node only performs an aging detection on a terminal device on its own local link, and does not ages stored address correspondence information actively. For example, address correspondence information obtained by a message of control plane may be set at a relatively high confidence level (confidence level), such as 254. Stored address correspondence information is aged only when it is detected that a terminal device on a local link needs to be aged, or an aging indication which is sent by another network node through a message of control plane is received.

Through adopting the technical solution of the embodiments of the present invention, since besides the ingress network node, other network nodes also store address correspondence information in their address correspondence information tables, when receiving an address correspondence information request, they may directly reply with an address correspondence information response without broadcasting the request, decreasing the bandwidth occupied by broadcasting address correspondence information request in a data link layer of applying link state routing.

Additionally, Since the message of control plane does not make an edge network node learn MAC address and a device identification of an ingress network node is included in the address correspondence information, a MAC table may be updated directly according to existing address correspondence information when an address correspondence information request is received, thereby reducing the MAC table of an edge network node, and reducing the complexity of a device and lowering the requirements to the specifications of the MAC table while guaranteeing the correct forwarding of a message.

Combined with FIG. 2, another embodiment of the present invention is illustrated below.

Figure 2:
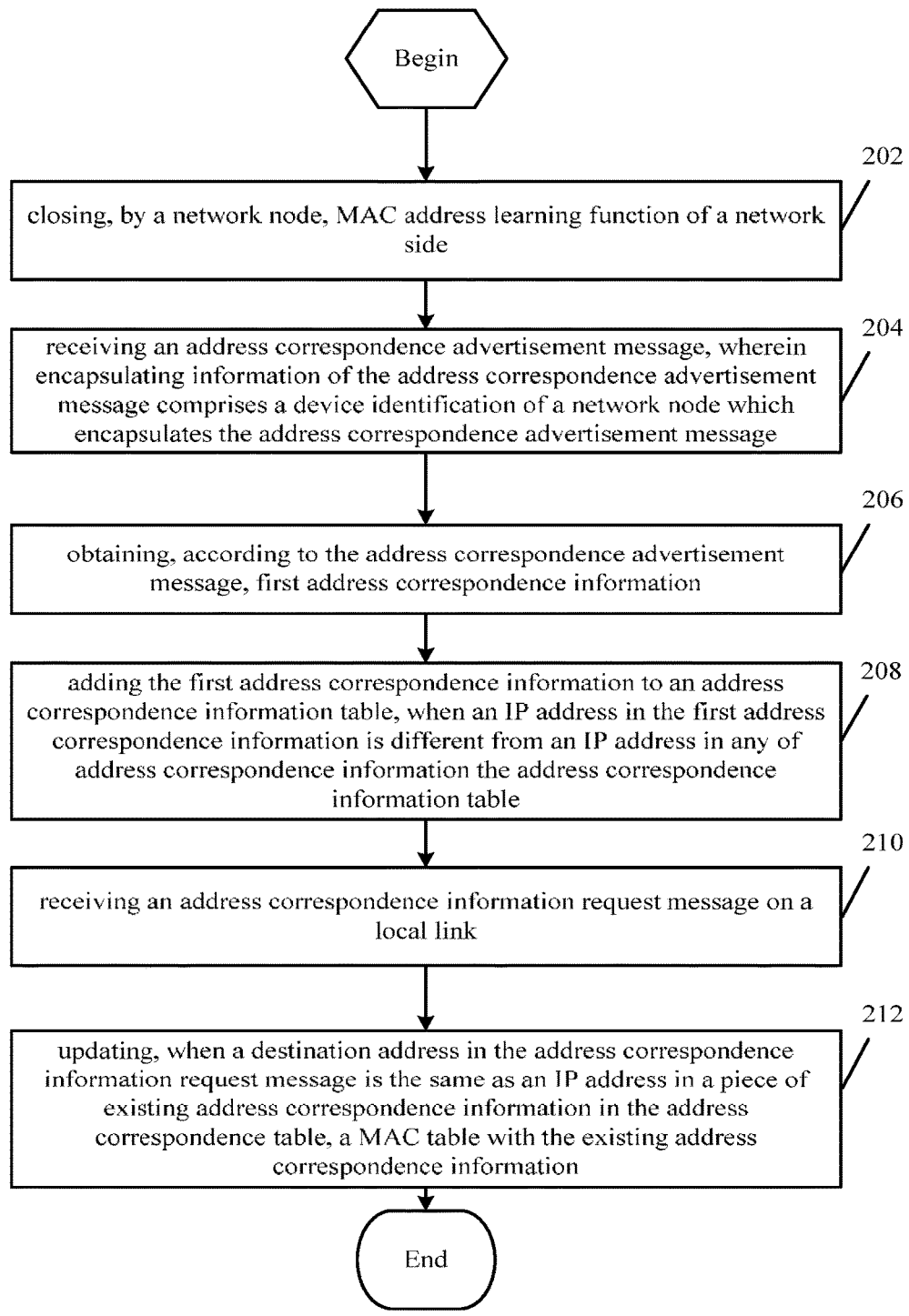
FIG. 2 is a flowchart of a method of updating MAC table in a data link layer protocol of applying Link State Routing in an embodiment of the present invention.

FIG. 2 is a flowchart of a method of updating Medium Access Control MAC table in a data link layer protocol of applying Link State Routing in an embodiment of the present invention. The method comprises the following contents.

202. A network node closes MAC address learning function of a network side.

Generally, a network node performs MAC address learning when a message of a network side is received, i.e. updating a MAC table with a source MAC address of the message and a device identification of an ingress network node. In the present embodiment, MAC address learning function of the network side is closed without changing MAC address learning function of a local link side.

204. Receive an address correspondence advertisement message, wherein encapsulation information of the address correspondence advertisement message comprises a device identification of a network node which encapsulates the address correspondence advertisement message.

In IPv6, the address correspondence advertisement message may be an unsolicited NA message. A target address of the unsolicited NA message is an IP address of a terminal device sending the message, wherein the IP address may be a local IP address or a global IP address; a destination address is an all-nodes multicast address; a Target link-layer Address is a link-layer address of a terminal device sending the message, wherein the link-layer address is a MAC address in an Ethernet; and a solicited flag is set to zero.

In IPv4, the address correspondence advertisement message may be an ARP message. Specifically, the ARP message may be a gratuitous ARP message, or it may also be a broadcasted ARP Reply message. When a virtual machine makes a migration, the virtual machine advertises the migration by utilizing an RARP message after the migration. At this moment, a network node which receives the RARP message on a local link transfers, according to its own address correspondence information table, the RARP message into an address correspondence advertisement message, such as a gratuitous ARP message or a broadcasted ARP Reply message, encapsulates and then sends the address correspondence advertisement message to the network side, wherein a device identification of the network node which encapsulates the address correspondence advertisement message is included in the encapsulation information. The message type of a gratuitous ARP message is request, a sender address is an IP address of a terminal device sending the message, a sender MAC address is a MAC address of a terminal device sending the message, a target IP address is an IP address of a terminal device sending the message and a target MAC address is a broadcast address. The format of a broadcasted ARP Reply message is basically the same, but a message type is reply and a target IP address is a broadcast address. The message type of an RARP message is request and a sender IP address is a default value, such as all zero, so an IP address in first ARP information is also a default value.

After receiving an address correspondence advertisement message, the ingress network node encapsulates the address correspondence advertisement message and broadcasts the address correspondence advertisement message, wherein its own device identification is included in encapsulation information. As a result, other network nodes may receive the address correspondence advertisement message of a device identification of a network node which encapsulates the address correspondence advertisement message in the encapsulation information. The manner of encapsulating a message may be a TRILL encapsulation or a MAC-in-MAC encapsulation.

206. Obtain first address correspondence information according to the address correspondence advertisement message, wherein the first address correspondence information comprises a correspondence between a Medium Access Control MAC address of a terminal device which sends the address correspondence advertisement message, an Internet Protocol IP address of the terminal device which sends the address correspondence advertisement message and a device identification in the address correspondence advertisement message.

The first address correspondence information is a correspondence between a MAC address, an IP address of a terminal device which sends the address correspondence advertisement message and a device identification of an ingress network node of the terminal device. In TRILL, a device identification of an ingress network node of the terminal device may be obtained from an ingress routing bridge nickname domain of a message header of the address correspondence advertisement message encapsulated. In SPB, a device identification of an ingress network node of the terminal device is B-MAC, which may be obtained from a Backbone source MAC address (Backbone source MAC address, S-DA) field of the address correspondence advertisement message encapsulated. In IPv6, the first address correspondence information includes first neighbor cache information. In IPv4, the first address correspondence information includes first ARP information.

208. Add the first address correspondence information to an address correspondence information table, when an IP address in the first address correspondence information is different from an IP address in any piece of address correspondence information in the address correspondence information table.

The address correspondence information table is a table for storing address correspondence information in a network node. In IPv6, the address correspondence information table is a neighbor cache information table. In IPv4, the address correspondence information table is an ARP information table. Since besides a MAC address and an IP address, a device identification of an ingress network node is also comprised in the first address correspondence information, compared with traditional neighbor cache and ARP tables, each item of a neighbor cache information table and an ARP information table adds content of device identification.

In IPv6, when an IP address in the first neighbor cache information is different from an IP address in any piece of neighbor cache information in a neighbor cache information table, it may be assumed that a new terminal device is online or the terminal device changes an IP address. At this moment, a network node which receives the address correspondence advertisement message encapsulated adds the first neighbor cache information to the neighbor cache information table.

When IP and MAC addresses in the first neighbor cache information are the same as IP and MAC addresses in a piece of existing neighbor cache information in the neighbor cache information table, and a device identification in the existing neighbor cache information is different from a device identification of the network node, it may be assumed that the terminal device makes a migration, and an ingress network node before the migration is not this network node. And when the MAC address in the existing neighbor cache information is different from a MAC address of any existing MAC item in a MAC table, the MAC address of the terminal device being not in the MAC table indicates that none of local terminal devices has communicated with the terminal device yet. At this moment, a network node which receives the address correspondence advertisement message encapsulated updates the existing neighbor cache information with the first neighbor cache information.

When the IP and MAC addresses in the first neighbor cache information are the same as IP and MAC addresses in a piece of existing neighbor cache information in the neighbor cache information table, and a device identification in the existing neighbor cache information is different from a device identification of the network node, it may be assumed that the terminal device makes a migration, and a ingress network node before the migration is not this network node. And when the MAC address in the existing neighbor cache information is the same as a MAC address of an existing MAC item in a MAC table, the MAC address of the terminal device being in the MAC table indicates that a local terminal device has communicated with the terminal device. At this moment, a network node which receives an address correspondence advertisement message encapsulated updates the existing neighbor cache information and the existing MAC item with the first neighbor cache information.

Since before sending an unsolicited NA message, a terminal device makes duplicate address detection, other types of duplicate address phenomena except migration does not exist in general.

In IPv4, when an IP address in the first address correspondence information is not in an address correspondence information table, i.e. when an IP address in the first ARP information is different from an IP address in any piece of ARP information in an ARP information table, it may be assumed that a new terminal device is online or the terminal device changes an IP address. At this moment, a network node which receives the address correspondence advertisement message encapsulated adds the first ARP information to the ARP information table.

When an IP address in the first ARP information is the same as an IP address in a piece of existing ARP information in the ARP information table, a MAC address in the first ARP information is the same as a MAC address in the existing ARP information, and a device identification in the existing ARP information is different from a device identification of the network node, it may be assumed that the terminal device makes a migration, and an ingress network node before the migration is not this network node. And when the MAC address in the existing ARP information is different from a MAC address of any existing MAC item in a MAC table, the MAC address of the terminal device being not in the MAC table indicates that none of local terminal devices has communicated with the terminal device yet. At this moment, a network node which receives the address correspondence advertisement message encapsulated updates the existing ARP information with the first ARP information.

When an IP address in the first ARP information is the same as an IP address in a piece of existing ARP information in the ARP information table, a MAC address in the first ARP information is the same as a MAC address in the existing ARP information, and a device identification in the existing ARP information is different from a device identification of the network node, it may be assumed that the terminal device makes a migration, and an ingress network node before the migration is not this network node. And when the MAC address in the existing ARP information is the same as a MAC address of an existing MAC item in a MAC table, the MAC address of the terminal device being in the MAC table indicates that a local terminal device has communicated with the terminal device. At this moment, a network node which receives the address correspondence advertisement message encapsulated updates the existing ARP information and the existing MAC item with the first ARP information.

When an IP address in the first ARP information is the same as an IP address in a piece of existing ARP information in the ARP information table, a MAC address in the ARP information is different from a MAC address in the existing ARP information, and the MAC address in the existing ARP information is different from a MAC address of any existing MAC item in the MAC table, the existing ARP information is updated with the first ARP information. Since none of local terminal devices has communicated with the terminal device yet, the network node only needs to update the ARP information table.

When an IP address in the first ARP information is the same as an IP address in a piece of existing ARP information in the ARP information table, a MAC address in the first ARP information is different from a MAC address in the existing ARP information, and the MAC address in the existing ARP information is the same as a MAC address of an existing MAC item in a MAC table, as a local terminal device has communicated with the terminal device, ARP information of the local terminal device is required to be updated. The network node updates the existing ARP information and the existing MAC item with the first ARP information, and broadcasts an ARP message de-encapsulated on a local link corresponding to the ARP message encapsulated. The local link corresponding to the ARP message encapsulated means when an ARP message is sent by the terminal device from a certain VLAN to an ingress network node, a network node which receives the address correspondence advertisement message encapsulated broadcasts the ARP message de-encapsulated on the VLAN of a local link.

When the IP address in the first ARP information is the same as an IP address in a piece of existing ARP information in the ARP information table, and a device identification in the existing ARP information is the same as a device identification of the network node, it indicates that there might be a terminal device which might has an address conflict on a local link of the network node, or an ingress network node of the terminal device before a migration is this network node. At this moment, a network node which receives an address correspondence advertisement message encapsulated broadcasts the ARP message de-encapsulated on a local link corresponding to the ARP message encapsulated.

210. Receive an address correspondence information request message on a local link.

In IPv6, the address correspondence information request message includes a neighbor solicitation NS message, wherein a source address of a NS message is an IP address of a terminal device which sends the NS message, a destination address is a solicited-node multicast address of a terminal device of which address correspondence information is solicited, and a target address is an IP address of a terminal device of which address correspondence information is solicited.

In IPv4, an address correspondence information request message includes an ARP Request message, wherein a sender address of an ARP Request message is an IP address of a terminal device which sends the ARP Request message, and a target address is an IP address of a terminal device of which address correspondence information is requested.

212. Generate, when a target address in the address correspondence information request message is the same as an IP address in a piece of existing address correspondence information in the address correspondence information table, an address correspondence information response message corresponding to the existing address correspondence information, send the address correspondence information response message corresponding to the existing address correspondence information to a terminal device which sends the address correspondence information request message, and update a MAC table according to the existing address correspondence information.

When a network node receives an address correspondence information request message on a local link, if a target IP address in the address correspondence information request message is the same as an IP address in a piece of existing address correspondence information in the address correspondence information table, the network node does not need to forward the address correspondence information request message to the network side, generates an address correspondence information response message corresponding to the existing address correspondence information, and sends the response message to a terminal device which sends the request message.

In IPv6, the address correspondence response message includes an NA message, wherein a source address of the NA message is an IP address of existing neighbor cache information in a neighbor cache information table, a destination address is a source address of a corresponding NS message, a target address is a target address of a corresponding NS message, a target link layer address is a MAC address of the existing neighbor cache information in the neighbor cache information table, and a solicited flag is set to 1.

In IPv4, the address correspondence information response message includes an ARP Reply message, wherein a sender address of the ARP Reply message is an IP address of existing ARP information in an ARP information table, a target address is a target address of a corresponding ARP Request message, and a target link layer address is a MAC address of existing ARP information in an ARP information table.

Since an edge network node closes a MAC address learning function of a network side, a corresponding item is needed to be added to a MAC table at a proper time to ensure the correct forwarding of a message. Since a terminal device sending an address correspondence information request message indicates that the terminal device probably needs to communicate with a requested terminal device next, the network node, at this moment, updates the MAC table according to the existing address correspondence information. In a data link layer protocol of applying link state routing, the MAC table of the network node corresponds to an item storing correspondence of a MAC address and a device identification of the network node, as a result, it is only needed to add the corresponding contents in an item of the address correspondence information to the MAC table.

Under some situations, a terminal device might perform a communication of data messages directly instead of sending a message on address correspondence information. At this moment, in order to avoid that the MAC table cannot be updated when MAC address learning is off, the method may further comprises the following steps.

When a network node which receives a data message can not find a corresponding item in a MAC table, if there is a corresponding item in an address correspondence information table, corresponding contents in the item is added to the MAC table.

When a network node which receives a data message can not find a corresponding item in a MAC table, if there is no corresponding item in an address correspondence information table, the network node generates an address correspondence information request message, encapsulates and then broadcasts the address correspondence information request message. Another network node broadcasts the address correspondence information request message on a corresponding local link after receiving the message. A requested terminal device sends an address correspondence information response message. An ingress network node of the requested terminal device encapsulates the message and then sends it to the network node which receives the data message. The network node which receives the data message updates, according to the address correspondence information response message, an address correspondence information table and a MAC table. At the same time, the ingress network node of the requested terminal device generates a corresponding address correspondence information advertisement message according to the address correspondence information response message, encapsulates the message and then broadcasts the message. A network node which receives the broadcasted message continues to process it according to the method in the above-mentioned embodiment.

For an ARP information table or a neighbor cache information table, it is generally controlled and accessed by a CPU and is stored in a memory, its access and lookup speed is relatively slow, and there is not clear restriction to the specification, while for a MAC table, it is generally controlled and accessed by an ASIC, a FPGA or an NP and is stored in a content addressable memory CAM, its access and lookup speed is fast, but its cost and power consumption is high and there are some restrictions to the specification.

Since a MAC address learning function of a network side is closed, an address correspondence advertisement message, an address correspondence information request message or an address correspondence response message of the network side does not make an edge network node learn MAC address and a device identification of an ingress network node is included in the address correspondence information, a MAC table may be updated directly according to existing address correspondence information when an address correspondence information request is received, thereby reducing a MAC table of an edge network node, and reducing the complexity of a device and lowering the requirements to the specifications of the MAC table while guaranteeing the correct forwarding of a message.

Additionally, since besides the ingress network node, other network nodes also store address correspondence information in their address correspondence information tables, so when they receive an address correspondence information request, they may directly reply with an address correspondence information response without broadcasting the request, decreasing the bandwidth occupied by broadcasting address correspondence information request in a data link layer of applying link state routing.

Combined with FIG. 3, another embodiment of the present invention is illustrated below.

Figure 3:
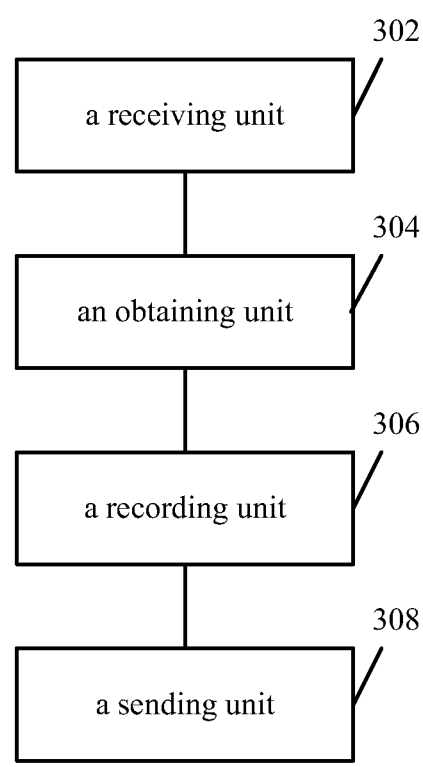
FIG. 3 is a diagram of a sending apparatus of address correspondence information in a data link layer protocol of applying Link State Routing in another embodiment of the present invention.

FIG. 3 is a diagram of a sending apparatus of address correspondence information in a data link layer protocol of applying Link State Routing in another embodiment of the present invention. The sending apparatus is generally realized by a network node in a network. The data link layer protocol of applying link state routing may be TRILL, or it may be Shortest Path Bridging. In TRILL, the network node is generally a routing bridge device. In SPB, the network node is generally an edge bridge device. The sending apparatus comprises the following units.

A receiving unit 302, is used for receiving an address correspondence advertisement message on a local link.

In TRILL, the network node may be a routing bridge device which receives the address correspondence advertisement message. In SPB, the network node may be an edge bridge device which receives the address correspondence advertisement message.

In TRILL, the network node is an ingress RB of the address correspondence advertisement message, and it is also an ingress RB of other messages in a same VLAN which is sent by the terminal device that sends the address correspondence advertisement message, so it may be named as an ingress RB for short. In SPB, the network node is an ingress edge bridge device of the address correspondence advertisement message, and it is also an ingress RB of other messages in a same VLAN which is sent by a terminal device that sends the address correspondence advertisement message, so it may be named as an ingress edge bridge device for short. As a result, the network node may be generally named as an ingress network node.

The address correspondence advertisement message carries a MAC address and an IP address of the terminal device which sends the address correspondence advertisement message.

In IPv6, the address correspondence advertisement message may be an unsolicited NA message. A Target Address of an unsolicited NA message is an IP address of the terminal device sending the message, wherein the IP address may be a local IP address or a global IP address; a destination address is an all-nodes multicast address; a Target Link-Layer Address is a Link-Layer Address of a terminal device sending the message, wherein the Link-Layer Address is a MAC address in an Ethernet; and a Solicited flag is set to zero.

In IPv4, the address correspondence advertisement message may be an ARP message. Specifically, the ARP message may be a gratuitous ARP message, it may also be an RARP message, and it may also be a broadcasted ARP reply message. The message type of a gratuitous ARP message is solicitation, a sender address is an IP address of the terminal device sending the message, a sender MAC address is a MAC address of the terminal device sending the message, a target IP address is an IP address of the terminal device sending the message and a target MAC address is a broadcast address. The format of the broadcasted ARP Reply message is basically the same, but the message type is reply and a target IP address is a broadcast address. The message type of an RARP message is request and a sender IP address is a default value, such as all zero, so an IP address in first ARP information is also a default value.

When the network node receives the address correspondence advertisement message, it performs MAC address learning in a traditional way.

An obtaining unit 304, is used for obtaining first address correspondence information according to the address correspondence advertisement message, wherein the first address correspondence information comprises a correspondence between a Medium Access Control MAC address of a terminal device which sends the address correspondence advertisement message, an Internet Protocol IP address of the terminal device which sends the address correspondence advertisement message and a device identification of the network node.

The first address correspondence information is a correspondence between a MAC address and an IP address of the terminal device sending the address correspondence advertisement message and a device identification of an ingress network node of the terminal device. The device identification of the ingress network node of the terminal device is a device identification of the network node receiving the address correspondence advertisement message. In IPv6, the first address correspondence information includes first neighbor cache information. In IPv4, the first address correspondence information includes first ARP information.

In TRILL, the device identification may use a nickname of a routing bridge device, or it may also directly use an IS-IS identification of a routing bridge device. In SPB, the device identification may be a B-MAC of an edge bridge device. When the network node records its own device identification, it may use a special identification, such as Local (Local), instead of the network node recording its own actual device identification in an address correspondence information table. Certainly, when the network node sends a message, it still uses its own actual device identification.

A recording unit 306, is used for recording the first address correspondence information in an address correspondence information table when the first address correspondence information is not in the address correspondence information table.

The address correspondence information table is a table for storing address correspondence information in the network node. In IPv6, the address correspondence information table is a Neighbor Cache (Neighbor Cache) information table. In IPv4, the address correspondence information table is an ARP information table. Since the first address correspondence information further comprises the device identification of the ingress network node besides the MAC address and the IP address, compared with traditional neighbor cache and ARP tables, each item of the neighbor cache information table and the ARP information table adds contents of device identification. It is appreciated for those of ordinary skill in the art that the address correspondence information table may be an individual table, or it may also be consisted of a plurality of individual tables.

The first address correspondence information being not in the address correspondence information table means that at least one of the MAC address, the IP address or the device identification in the first address correspondence information is not in the address correspondence information table, i.e. at least one of the three is different from all of the items of the address correspondence information table.

In IPv6, when an IP address in the first neighbor cache information is different from an IP address in any piece of neighbor cache information in the neighbor cache information table, it may be assumed that a new terminal device is online or the terminal device changes its IP address. At this moment, the ingress network node adds the first neighbor cache information in the neighbor cache information table.

When the IP and MAC addresses in the first neighbor cache information are the same as IP and MAC addresses in a piece of existing neighbor cache information in the neighbor cache information table, and the device identification in the first neighbor cache information is different from a device identification in the existing neighbor cache information, it may be assumed that the terminal device which originally takes the other device as an ingress network node changes an access position, i.e. the terminal device makes a migration. At this moment, the recording unit 306 updates the existing neighbor cache information with the first neighbor cache information.

Since the terminal device has performed a duplicate address detection (duplicate address detection, DAD) before sending the unsolicited NA message, generally, there are not other types of duplicate address phenomenon except migration.

In IPv4, when the IP address in the first address correspondence information is not in the address correspondence information table, i.e. when the IP address in the first ARP information is different from an IP address in any piece of ARP information in the ARP information table, it may be assumed that a new terminal device is online or the terminal device changes an IP address. At this moment, the recording unit 306 adds the first ARP information to the ARP information table.

When the IP address in the first ARP information is the same as an IP address in a piece of existing ARP information in the ARP information table, the MAC address in the first ARP information is the same as a MAC address in the existing ARP information, and a device identification in the first ARP information, i.e. the ingress network node's own device identification, is different from a device identification in the existing ARP information, it may be assumed that the terminal device which originally takes the other device as an ingress network node changes an access position, i.e. the terminal device makes a migration. At this moment, the recording unit 306 updates the existing ARP information with the first ARP information. Since the ingress network node has performed MAC address learning, there is no need to check and update the MAC table at this moment.

When the terminal device is a virtual machine, a Hypervisor (Hypervisor) layer is only responsible for functioning as a virtual physical device, wherein a virtual network card and MAC generation is within its management scope, while an IP address is managed and assigned by a Guest OS (Guest OS), which has nothing to do with the hypervisor layer. If an ARP message which carries IP information is to be sent, the assistance of a Guest OS is needed, which need to explore corresponding tools for different types of operation systems. In order to simplify the complexity of the virtual machine, the virtual machine advertises a migration by an RARP message traditionally after the migration. At this moment, a sender IP address in the RARP message is a default value, such as all zero, so the IP address in first ARP information is also a default value. The RARP message is only used for advertising the migration and does not need to be replied.

As a result, when the IP address in the first ARP information is a default value, the MAC address in the first ARP information is the same as the MAC address in the existing ARP information, and the device identification in the first ARP information is different from the device identification in the existing ARP information, it may be assumed that a virtual machine migration is happened. At this moment, the ingress network node updates the device identification in the existing ARP information with the device identification in the first ARP information and replaces the IP address in the first ARP information with the IP address in the existing ARP information. At this moment, the IP address in first ARP information which is sent through a message of control plane, or in an ARP message which is TRILL encapsulated and sent in a form of unicast in TRILL, or in an ARP message which is encapsulated according to MAC-in-MAC and sent in a form of unicast in SPB, hereafter, is not a default value but the IP address in the first ARP information.

When the IP address in the first ARP information is the same as an IP address in a piece of existing ARP information in the ARP information table and the MAC address in the first ARP information is different from a MAC address in the existing ARP information, it may be assumed that an address conflict occurs or the terminal device changes a network card while still accessing with an original IP address. There are two choices at this moment: the first one is that the recording unit 306 updates the existing ARP information with the first ARP information. Optionally, the ARP message may be further encapsulated and be sent to a network node corresponding to the device identification in the existing ARP information in a form of unicast, wherein encapsulation information comprises the device identification in the first address correspondence information. The manner of encapsulating a message may be TRILL encapsulation or MAC-in-MAC encapsulation. The second one is that, under the case that the device identification in the first ARP information is different from the device identification in the existing ARP information, instead of updating the existing ARP information at first, the recording unit 306 encapsulates the ARP message and sends it to the network node corresponding to the device identification in the existing ARP information, wherein encapsulation information comprises the device identification in the first address correspondence information. The network node, i.e. the egress network node, de-encapsulates to obtain the ARP message and then broadcasts the ARP message on a local link corresponding to the ARP message encapsulated. A local link corresponding to the ARP message encapsulated means that when the ARP message is sent by the terminal device from a certain VLAN to the ingress network node, the egress network node broadcasts the ARP message on the VLAN of the local link. If the situation is caused by an address conflict, a terminal device which has an address conflict with the terminal device sending the ARP message responds with an ARP Reply message, otherwise, it indicates that the terminal device changes a network card while still accessing with an original IP address or the terminal device which has an address conflict is offline. Therefore, if an ARP response message which has the same IP address as that in the first ARP information is not received in a pre-determined time, the recording unit 306 may update the existing ARP information with the first ARP information. Under the case that the device identification of the first ARP information is the same as a device identification in a piece of existing ARP information, the ARP message is broadcasted on the local link corresponding to the ARP message, i.e. the ARP message is broadcasted on the VLAN receiving the ARP message. And if an ARP response message which has the same IP address as that in the first ARP information is not received in a pre-determined time, the existing ARP information is updated with the first ARP information.

When the first address correspondence information is in the address correspondence information table, a repeated ARP message might be received. The ARP message may be only broadcasted on a corresponding local link without being broadcasted on a network side.

A sending unit 308, is used for sending the first address correspondence information to other network nodes through a message of control plane, wherein the message of control plane makes the other network nodes record the first address correspondence information in their address correspondence information tables.

Since the message of control plane does not trigger the network node to perform MAC address learning, the MAC table of the edge network node is not increased. The message of control plane here means a date link layer advertisement message based on link state routing. In TRILL, the message of control plane may adopt an ESADI message, or adopt other messages of control plane which can spread address correspondence information. In SPB, the message of control plane may adopt a defined format based on IS-IS TLV, and the information at least comprises IP address and MAC address information in the first address correspondence information.

When receiving the first address correspondence information through a message of control plane, a network node records the first address correspondence information in its address correspondence information table. Since when the first address correspondence information is in the address correspondence information table of the ingress network node, the sending unit 308 does not spread the first address correspondence information, the first address correspondence information is certainly not in the address correspondence information table of the network node which receives the first address correspondence information through the message of control plane.

In IPv6, when an IP address in the first neighbor cache information is different from an IP address in any piece of neighbor cache information in the neighbor cache information table, the first neighbor cache information is added to the neighbor cache information table.

When IP and MAC addresses in the first neighbor cache information are the same as IP and MAC addresses in a piece of existing neighbor cache information in the neighbor cache information table, and a device identification in the existing neighbor cache information is different from a device identification of the network node, it may be assumed that the terminal device makes a migration and an ingress network node before the migration is not this network node. And when the MAC address in the existing neighbor cache information is different from a MAC address of any existing MAC item in a MAC table, the MAC address of the terminal device being not in the MAC table indicates that none of local terminal devices has communicated with the terminal device yet. The network node which receives the first address correspondence information through the message of control plane only needs to update the existing neighbor cache information with the first neighbor cache information.

When the IP and MAC addresses in the first neighbor cache information are the same as IP and MAC addresses in a piece of existing neighbor cache information in the neighbor cache information table, and a device identification in the existing neighbor cache information is different from the device identification of the network node, it may be assumed that the terminal device makes a migration and an ingress network node before the migration is not this network node. And when the MAC address in the existing neighbor cache information is the same as a MAC address of an existing MAC item in the MAC table, the MAC address of the terminal device being in the MAC table indicates that a local terminal device has communicated with the terminal device. The network node which receives the first address correspondence information through the message of control plane needs to update the existing neighbor cache information and the existing MAC item with the first neighbor cache information.

Since the terminal device performs a duplicate address detection before sending the unsolicited NA message, there are not other types of duplicate address phenomena except migration in general.

In IPv4, when an IP address in the first ARP information is different from an IP address in any piece of ARP information in the ARP information table, the network node which receives the first address correspondence information through the message of control plane adds the first ARP information to the ARP information table.

When the IP address in the first ARP information is the same as an IP address in a piece of existing ARP information in the ARP information table, a MAC address in the first ARP information is the same as a MAC address in the existing ARP information, and a device identification in the existing ARP information is different from the device identification of the network node which receives the first address correspondence information through the message of control plane, it may be assumed that the terminal device makes a migration and an ingress network node before the migration is not this network node. And when the MAC address in the existing ARP information is different from a MAC address of any existing MAC item in the MAC table, the MAC address of the terminal device being not in the MAC table indicates that none of local terminal devices has communicated with the terminal device yet. The network node which receives the first address correspondence information through the message of control plane only needs to update the existing ARP information with the first ARP information.

When the IP address in the first ARP information is the same as an IP address in a piece of existing ARP information in the ARP information table, the MAC address in the first ARP information is the same as a MAC address in the existing ARP information, and a device identification in the existing ARP information is different from the device identification of the network node which receives the first address correspondence information through the message of control plane, it may be assumed that the terminal device makes a migration and the ingress network node before the migration is not this network node. And when the MAC address in the existing ARP information is the same as a MAC address of an existing MAC item in the MAC table, the MAC address of the terminal device being in the MAC table indicates that a local terminal device has communicated with the terminal device. The network node which receives the first address correspondence information through the message of control plane needs to update the existing ARP information and the existing MAC item with the first ARP information. At this moment, there is no need to locally advertise that the terminal device makes a migration, since for a local terminal device, regardless of whether a non-local terminal device makes a migration or not, it only needs to send a message to the ingress network node when communicating with the non-local terminal device and subsequent processing is achieved by the ingress network node. And the local terminal device's information on the non-local terminal device which makes a migration, such as an IP address, a MAC address, a sending port and so on is not changed.

When the IP address in the first ARP information is the same as an IP address in a piece of existing ARP information in the ARP information table, the MAC address in the first ARP information is different from a MAC address in the existing ARP information, and the MAC address in the existing ARP information is different form a MAC address of any existing MAC item in the MAC table, the existing ARP information is updated with the first ARP information. Since none of local terminal devices has communicated with the terminal device yet, the network node which receives the first address correspondence information through the message of control plane only needs to update the ARP information table.

When the IP address in the first ARP information is the same as an IP address of a piece of existing ARP information in the ARP information table, the MAC address in the first ARP information is different from a MAC address in the existing ARP information, and the MAC address in the existing ARP information is the same as a MAC address of an existing MAC item in the MAC table, as a local terminal device has communicated with the terminal device, ARP information of the local terminal device is required to be updated. The network node which receives the first address correspondence information through the message of control plane updates the existing ARP information and the existing MAC item with the first ARP information, generates an ARP message corresponding to the first information and broadcasts the ARP message corresponding to the first ARP information on a local link corresponding to the message of control plane. Since the message of control plane carries all the information which is enough to reconstruct an original ARP message, the network node which receives the first address correspondence information through the message of control plane may generate an ARP message corresponding to the ARP message received by the ingress network node, such as a gratuitous ARP message or a broadcasted ARP Reply message. When the ARP message is sent by the terminal device from a certain VLAN to the ingress network node, the message of control plane includes information on the VLAN. The network node which receives the first address correspondence information through the message of control plane broadcasts the generated ARP message on the VLAN of a local link.

The above-mentioned solution is enough for the solution adopted in the recording unit 306 which encapsulates and sends an ARP message, in a manner of unicast, to a network node corresponding to the device identification in the existing ARP information. However, if not adopting the solution that an ingress network node encapsulates and sends an ARP message, in a manner of unicast, to a network node corresponding to the device identification in the existing ARP information, a network node which receives the first address correspondence information through a message of control plane further needs to perform the following judgments and actions:

When the IP address in the first ARP information is the same as an IP address in a piece of existing ARP information in the ARP information table and a device identification in the existing ARP information is the same as the device identification of the network node, it indicates that a terminal device which might has an address conflict may be on a local link of the network node. Therefore, the network node needs to generate an ARP message corresponding to the first ARP information and to broadcast the ARP message corresponding to the first ARP information on a local link corresponding to the message of control plane. Since the message of control plane carries all the information which is enough to reconstruct an original ARP message, the network node which receives the first address correspondence information through the message of control plane may generate an ARP message corresponding to an ARP message received by the ingress network node, such as a gratuitous ARP message or a broadcasted ARP Reply message. When an ARP message is sent by the terminal device from a certain VLAN to the ingress network node, the message of control plane includes information on the VLAN. A network node which receives the first address correspondence information through the message of control plane broadcasts the generated ARP message on the VLAN of a local link.

The recording unit 306 is further used for recording second address correspondence information in its address correspondence information table when the receiving unit 302 receives the second address correspondence information sent by another network node through a message of control plane. The second address correspondence information may be obtained, by the above-mentioned other network node, according to an address correspondence advertisement message received from a local link.

In IPv6, when an IP address in the second neighbor cache information is different from an IP address in any item of neighbor cache information in the neighbor cache information table, the recording unit 306 adds the second neighbor cache information to the neighbor cache information table.

When IP and MAC addresses in the second neighbor cache information are the same as IP and MAC addresses in a piece of existing neighbor cache information in the neighbor cache information table, and a device identification in the existing neighbor cache information is different from a device identification of the network node, it may be assumed that the terminal device makes a migration and an ingress network node before the migration is not this network node. And when the MAC address in the existing neighbor cache information is different from a MAC address of any existing MAC item in a MAC table, the MAC address of the terminal device being not in the MAC table indicates that none of local terminal devices has communicated with the terminal device yet. The recording unit 306 only needs to update the existing neighbor cache information with the second neighbor cache information.

When the IP and MAC addresses in the second neighbor cache information are the same as IP and MAC addresses in a piece of existing neighbor cache information in the neighbor cache information table, and a device identification in the existing neighbor cache information is different from the device identification of the network node, it may be assumed that the terminal device makes a migration and an ingress network node before the migration is not this network node. And when the MAC address in the existing neighbor cache information is the same as a MAC address of an existing MAC item in the MAC table, the MAC address of the terminal device being in the MAC table indicates that a local terminal device has communicated with the terminal device. The recording unit 306 needs to update the existing neighbor cache information and the existing MAC item with the second neighbor cache information.

Since the terminal device performs a duplicate address detection before sending the unsolicited NA message, there are not other types of duplicate address phenomena except migration in general.

In IPv4, when an IP address in the second ARP information is different from an IP address in any piece of ARP information in the ARP information table, the network node adds the second ARP information to the ARP information table.

When the IP address in the second ARP information is the same as an IP address in a piece of existing ARP information in an ARP information table, a MAC address in the second ARP information is the same as a MAC address in the existing ARP information, and a device identification in the existing ARP information is different from the device identification of the network node, it may be assumed that a terminal device makes a migration and a network node before the migration is not this network node. And when the MAC address in the existing ARP information is different from a MAC address of any existing MAC item in the MAC table, the MAC address of the terminal device being not in the MAC table indicates that none of local terminal devices has communicated with the terminal device yet. The recording unit 306 only needs to update the existing ARP information with the second ARP information.

When the IP address in the second ARP information is the same as an IP address in a piece of existing ARP information in the ARP information table, the MAC address in the second ARP information is the same as an MAC address in the existing ARP information, and a device identification in the existing ARP information is different from the device identification of the network node, it may be assumed that a terminal device makes a migration and a network node before the migration is not this network node. And when the MAC address in the existing ARP information is the same as a MAC address of an existing MAC item in the MAC table, the MAC address of the terminal device being in the MAC table indicates that a local terminal device has communicated with the terminal device. The network node needs to update the existing ARP information and the existing MAC item with the second ARP information. At this moment, there is no need to locally advertise that the terminal device makes a migration, since for a local terminal device, regardless of whether a non-local terminal device makes a migration or not, it only needs to send a message to the ingress network node when communicating with the non-local terminal and subsequent processing is achieved by the ingress network node. And the local terminal device's information on the non-local terminal device which makes a migration, such as an IP address, a MAC address, a sending port and so on is not changed.

When the IP address in the second ARP information is the same as an IP address in a piece of existing ARP information in the ARP information table, the MAC address in the second ARP information is different from a MAC address in the existing ARP information, and the MAC address in the existing ARP information is different from a MAC address of any existing MAC item in the MAC table, the existing ARP information is updated with the second ARP information. Since none of local terminal devices has communicated with the terminal device yet, the network node only needs to update the ARP information table.

When the IP address in the second ARP information is the same as an IP address in a piece of existing ARP information in the ARP information table, the MAC address in the second ARP information is different from a MAC address in the existing ARP information, and the MAC address in the existing ARP information is the same as a MAC address of any existing MAC item in the MAC table, as a local terminal device has communicated with the terminal device, ARP information of the local terminal device is required to be updated. The recording unit 306 updates the existing ARP information and the existing MAC item with the second ARP information, generates an ARP message corresponding to the second information and broadcasts the ARP message corresponding to the second ARP information on a local link corresponding to the message of control plane. Since the message of control plane carries all the information which is enough to reconstruct an original ARP message, the network node may generate an ARP message corresponding to the ARP message received by the another network node, such as a gratuitous ARP message or a broadcasted ARP Reply message. When the ARP message is sent by the terminal device from a certain VLAN to the another network node, the message of control plane includes information on the VLAN and the network node broadcasts the generated ARP message on the VLAN of a local link.

The above-mentioned solution is enough for the solution of encapsulating and sending an ARP message, in a manner of unicast, to a network node corresponding to a device identification in existing ARP information. However, if not adopting the solution that another network node encapsulates and sends an ARP message, in a manner of unicast, to a network node corresponding to the device identification in the existing ARP information, the recording unit 306 is also used for:

When the IP address in the second ARP information is the same as an IP address in a piece of existing ARP information in the ARP information table, and a device identification in the existing ARP information is the same as the device identification of the network node, it indicates that a terminal device which might has an address conflict may be on a local link of the network node, or an ingress network node of the terminal device before a migration is this network node.

Therefore, the recording unit 306 needs to generate an ARP message corresponding to the second ARP information, and to broadcast the ARP message corresponding to the second ARP information on a local link corresponding to the message of control plane. Since the message of control plane carries all the information which is enough to reconstruct an original ARP message, the recording unit 306 may generate an ARP message corresponding to an ARP message received by another network node, such as a gratuitous ARP message or a broadcasted ARP Reply message. When an ARP message is sent by the terminal device from a certain VLAN to the another network node, the message of control plane includes information on the VLAN and the recording unit 306 broadcasts the generated ARP message on the VLAN of a local link.

Since the message of control plane does not trigger MAC address learning, the recording unit 306 needs to add a corresponding item in the MAC table at a proper time to ensure the correct forwarding of the message. When the network node receives an address correspondence information request message on a local link, if a target IP address in the address correspondence information request message is the same as an IP address in a piece of existing address correspondence information in the address correspondence information table, there is no need to forward the address correspondence information request message to a network side. A network node which has received the address correspondence information request message generates an address correspondence information response message corresponding to the existing address correspondence information, and sends the response message to a terminal device which sends the address correspondence information request message. Since the terminal device sending an address correspondence information request message means that the terminal device most likely needs to communicate with a requested terminal device next, at this moment, the recording unit 306 updates a MAC table according to the existing address correspondence information. In a data link layer protocol of applying link state routing, a correspondence between a MAC address and a device identification of the network node is stored in an item of a MAC table of a network node corresponding to a network side, so the recording unit 306 only needs to add the corresponding content in the item of the address correspondence information to the MAC table.

In IPv6, then address correspondence information request message includes a NS message, and the address correspondence information response message includes a NA message. A source address of a NS message is an IP address of a terminal device which sends the NS message, a destination address is a solicited-node multicast address of a terminal device of which address correspondence information is solicited, and a target address is an IP address of a terminal device of which address correspondence information is solicited. A source address of a NA message is an IP address of existing neighbor cache information in a neighbor cache information table, a destination address is a source address of a corresponding NS message, a target address is a target address of a corresponding NS message, a target link layer address is a MAC address of neighbor cache information in the neighbor cache information table, and a solicited flag is set to 1.

In IPv4, the address correspondence information request message includes an ARP Request (ARP Request) message, and the address correspondence information response message includes an ARP Reply (ARP Reply) message. The message type of an ARP Request message is request, a sender address is an IP address of a terminal device sending the ARP Request message, and a target address is an IP address of a terminal device of which correspondence information is requested. The message type of an ARP Reply message is reply, a sender address is an IP address of existing ARP information in an ARP information table, a target address is a target address of a corresponding ARP Request message, and a target link layer address is a MAC address of existing ARP information in the ARP information table.

The ARP information table or the neighbor cache information table, which is generally controlled and accessed by a CPU, is stored in a memory with relatively slow access and lookup speed and without clear restriction to the specification, while the MAC table, which is generally controlled and accessed by an ASIC, a FPGA, or a NP, is stored in a CAM with fast access and lookup speed, but with high cost and high power consumption as well as some restrictions to the specification.

Since the message of control plane does not make an edge network node learn MAC address and a device identification of an ingress network node is included in address correspondence information, a MAC table may be updated directly according to the existing address correspondence information when an address correspondence information request is received, thereby reducing a MAC table of the edge network node, and reducing the complexity of a device and lowering the requirements to the specifications of the MAC table while guaranteeing the correct forwarding of a message.

Optionally, the above-mentioned sending apparatus may further comprise an aging unit which is used for performing an aging detection on a terminal device on a local link. When it is needed to age address correspondence information of a terminal device, the aging unit ages the address correspondence information and may further delete a corresponding item in a MAC table. The aging unit sends, by a message of control plane, the address correspondence information of the terminal device to another network node. An aging unit of the another network node which receives the message of control plane age the address correspondence information of the terminal according to the indication of the message of control plane, and may further delete a corresponding item in a MAC table. The aging unit only performs an aging detection on a terminal device on its own local link, and does not ages stored address correspondence information actively. For example, address correspondence information obtained by a message of control plane may be set at a relatively high confidence level (confidence level), such as 254. The aging unit ages stored address correspondence information only when it is detected that a terminal device on a local link is needed to be aged, or an aging indication which is sent by another network node through a message of control plane is received.

Through adopting the technical solution of the embodiments of the present invention, since besides the ingress network node, other network nodes also store address correspondence information in their address correspondence information tables, when receiving an address correspondence information request, they may directly reply with an address correspondence information response without broadcasting the request, decreasing the bandwidth occupied by broadcasting address correspondence information request in a data link layer of applying link state routing.

Additionally, Since the message of control plane does not make an edge network node learn MAC address and a device identification of an ingress network node is included in the address correspondence information, a MAC table may be updated directly according to existing address correspondence information when an address correspondence information request is received, thereby reducing the MAC table of an edge network node, and reducing the complexity of a device and lowering the requirements to the specifications of the MAC table while guaranteeing the correct forwarding of a message.

Combined with FIG. 4, another embodiment of the present invention is illustrated below.

Figure 4:
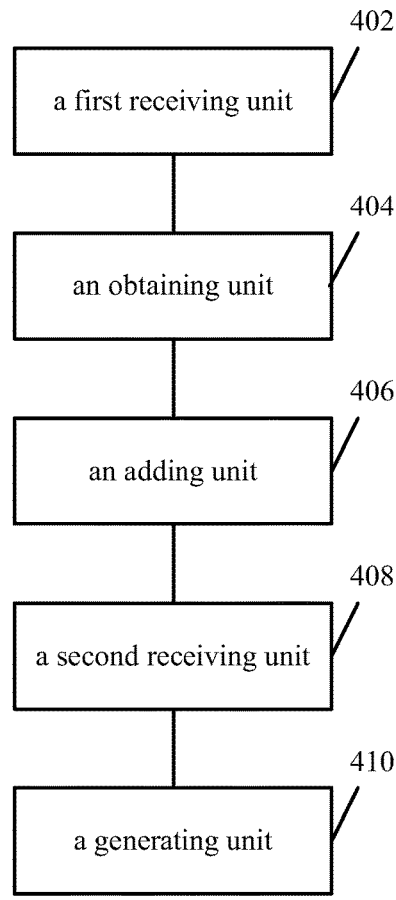
FIG. 4 is a diagram of an updating apparatus of MAC table in a data link layer protocol of applying Link State Routing in an embodiment of the present invention.

FIG. 4 is an updating apparatus of Medium Access Control MAC table in a data link layer protocol of applying Link State Routing in an embodiment of the present invention. The updating apparatus is generally realized by a network node in a network. MAC learning function of a network side of the updating apparatus is in a closing state. Generally, MAC address learning is performed when a network node receives a message of the network side, i.e. a MAC table is updated with a source MAC address of the message and a device identification of an ingress network node. In the present embodiment, a network node which realizes the updating apparatus closes MAC address learning function of the network side without changing MAC address learning function of local link side. The above-mentioned data link layer protocol of applying link state routing may be TRILL, or it may be Shortest Path Bridging. In TRILL, the network node is usually a routing bridge device. In SPB, the network node is usually an edge bridge device. The updating apparatus comprises:

A first receiving unit 402, is used for receiving an address correspondence advertisement message, wherein encapsulation information of the address correspondence advertisement message comprises a device identification of a network node which encapsulates the address correspondence advertisement message.

In IPv6, the address correspondence advertisement message may be an unsolicited NA message. A target address of the unsolicited NA message is an IP address of a terminal device sending the message, wherein the IP address may be a local IP address or a global IP address; a destination address is an all-nodes multicast address; a Target link-layer Address is a link-layer address of a terminal device sending the message, wherein the link-layer address is a MAC address in an Ethernet; and a solicited flag is set to zero.

In IPv4, the address correspondence advertisement message may be an ARP message. Specifically, the ARP message may be a gratuitous ARP message, or it may also be a broadcasted ARP Reply message. When a virtual machine makes a migration, the virtual machine advertises the migration by utilizing an RARP message after the migration. At this moment, a network node which receives the RARP message on a local link transfers, according to its own address correspondence information table, the RARP message into an address correspondence advertisement message, such as a gratuitous ARP message or a broadcasted ARP Reply message, encapsulates and then sends the address correspondence advertisement message to the network side, wherein a device identification of the network node which encapsulates the address correspondence advertisement message is included in the encapsulation information. The message type of a gratuitous ARP message is request, a sender address is an IP address of a terminal device sending the message, a sender MAC address is a MAC address of a terminal device sending the message, a target IP address is an IP address of a terminal device sending the message and a target MAC address is a broadcast address. The format of a broadcasted ARP Reply message is basically the same, but a message type is reply and a target IP address is a broadcast address. The message type of an RARP message is request and a sender IP address is a default value, such as all zero, so an IP address in first ARP information is also a default value.

After receiving an address correspondence advertisement message, the ingress network node encapsulates the address correspondence advertisement message and broadcasts the address correspondence advertisement message, wherein its own device identification is included in encapsulation information. As a result, receiving units of other network nodes may receive the address correspondence advertisement message of a device identification of a network node which encapsulates the address correspondence advertisement message in the encapsulation information. The manner of encapsulating a message may be a TRILL encapsulation or a MAC-in-MAC encapsulation.

An obtaining unit 404, is used for obtaining first address correspondence information according to the address correspondence advertisement message, wherein the first address correspondence information comprises a correspondence between a Medium Access Control MAC address of a terminal device which sends the address correspondence advertisement message, an Internet Protocol IP address of the terminal device which sends the address correspondence advertisement message and a device identification in the address correspondence advertisement message.

The first address correspondence information is a correspondence between a MAC address, an IP address of a terminal device which sends the address correspondence advertisement message and a device identification of an ingress network node of the terminal device. In TRILL, a device identification of an ingress network node of the terminal device may be obtained from an ingress routing bridge nickname domain of a message header of the address correspondence advertisement message encapsulated. In SPB, a device identification of an ingress network node of the terminal device is B-MAC, which may be obtained from an S-DA field of the address correspondence advertisement message encapsulated. In IPv6, the first address correspondence information includes first neighbor cache information. In IPv4, the first address correspondence information includes first ARP information.

An adding unit 406, is used for adding the first address correspondence information to an address correspondence information table, when an IP address in the first address correspondence information is different from an IP address in any piece of address correspondence information in the address correspondence information table.

The address correspondence information table is a table for storing address correspondence information in a network node. In IPv6, the address correspondence information table is a neighbor cache information table. In IPv4, the address correspondence information table is an ARP information table. Since besides a MAC address and an IP address, a device identification of an ingress network node is also comprised in the first address correspondence information, compared with traditional neighbor cache and ARP tables, each item of a neighbor cache information table and an ARP information table adds content of device identification.

In IPv6, when an IP address in the first neighbor cache information is different from an IP address in any piece of neighbor cache information in a neighbor cache information table, it may be assumed that a new terminal device is online or the terminal device changes an IP address. At this moment, the adding unit 406 adds the first neighbor cache information to the neighbor cache information table.

The above-mentioned updating apparatus may further comprise an updating unit. When IP and MAC addresses in the first neighbor cache information are the same as IP and MAC addresses in a piece of existing neighbor cache information in the neighbor cache information table, and a device identification in the existing neighbor cache information is different from a device identification of the network node, it may be assumed that the terminal device makes a migration, and an ingress network node before the migration is not this network node. And when the MAC address in the existing neighbor cache information is different from a MAC address of any existing MAC item in a MAC table, the MAC address of the terminal device being not in the MAC table indicates that none of local terminal devices has communicated with the terminal device yet. At this moment, the updating unit updates the existing neighbor cache information with the first neighbor cache information.

When the IP and MAC addresses in the first neighbor cache information are the same as IP and MAC addresses in a piece of existing neighbor cache information in the neighbor cache information table, and a device identification in the existing neighbor cache information is different from a device identification of the network node, it may be assumed that the terminal device makes a migration, and a ingress network node before the migration is not this network node. And when the MAC address in the existing neighbor cache information is the same as a MAC address of an existing MAC item in a MAC table, the MAC address of the terminal device being in the MAC table indicates that a local terminal device has communicated with the terminal device. At this moment, the updating unit updates the existing neighbor cache information and the existing MAC item with the first neighbor cache information.

Since before sending an unsolicited NA message, a terminal device makes duplicate address detection, other types of duplicate address phenomena except migration does not exist in general.

In IPv4, when an IP address in the first address correspondence information is not in an address correspondence information table, i.e. when an IP address in the first ARP information is different from an IP address in any piece of ARP information in an ARP information table, it may be assumed that a new terminal device is online or the terminal device changes an IP address. At this moment, the adding unit 406 adds the first ARP information to the ARP information table.

When an IP address in the first ARP information is the same as an IP address in a piece of existing ARP information in the ARP information table, a MAC address in the first ARP information is the same as a MAC address in the existing ARP information, and a device identification in the existing ARP information is different from a device identification of the network node, it may be assumed that the terminal device makes a migration, and an ingress network node before the migration is not this network node. And when the MAC address in the existing ARP information is different from a MAC address of any existing MAC item in a MAC table, the MAC address of the terminal device being not in the MAC table indicates that none of local terminal devices has communicated with the terminal device yet. At this moment, the updating unit updates the existing ARP information with the first ARP information.

When an IP address in the first ARP information is the same as an IP address in a piece of existing ARP information in the ARP information table, a MAC address in the first ARP information is the same as a MAC address in the existing ARP information, and a device identification in the existing ARP information is different from a device identification of the network node, it may be assumed that the terminal device makes a migration, and an ingress network node before the migration is not this network node. And when the MAC address in the existing ARP information is the same as a MAC address of an existing MAC item in a MAC table, the MAC address of the terminal device being in the MAC table indicates that a local terminal device has communicated with the terminal device. At this moment, the updating unit updates the existing ARP information and the existing MAC item with the first ARP information.

When an IP address in the first ARP information is the same as an IP address in a piece of existing ARP information in the ARP information table, a MAC address in the ARP information is different from a MAC address in the existing ARP information, and the MAC address in the existing ARP information is different from a MAC address of any existing MAC item in the MAC table, the updating unit updates the existing ARP information with the first ARP information. Since none of local terminal devices has communicated with the terminal device yet, the updating unit only needs to update the ARP information table.

When an IP address in the first ARP information is the same as an IP address in a piece of existing ARP information in the ARP information table, a MAC address in the first ARP information is different from a MAC address in the existing ARP information, and the MAC address in the existing ARP information is the same as a MAC address of an existing MAC item in a MAC table, as a local terminal device has communicated with the terminal device, ARP information of the local terminal device is required to be updated. The updating unit updates the existing ARP information and the existing MAC item with the first ARP information, and broadcasts an ARP message de-encapsulated on a local link corresponding to the ARP message encapsulated. The local link corresponding to the ARP message encapsulated means when an ARP message is sent by the terminal device from a certain VLAN to an ingress network node, a network node which receives the address correspondence advertisement message encapsulated broadcasts the ARP message de-encapsulated on the VLAN of a local link.

When the IP address in the first ARP information is the same as an IP address in a piece of existing ARP information in the ARP information table, and a device identification in the existing ARP information is the same as a device identification of the network node, it indicates that there might be a terminal device which might has an address conflict on a local link of the network node, or an ingress network node of the terminal device before a migration is this network node. At this moment, the updating unit broadcasts the ARP message de-encapsulated on a local link corresponding to the ARP message encapsulated.

A second receiving unit 408, is used for receiving an address correspondence information request message on a local link.

In IPv6, the address correspondence information request message includes a neighbor solicitation NS message, wherein a source address of a NS message is an IP address of a terminal device which sends the NS message, a destination address is a solicited-node multicast address of a terminal device of which address correspondence information is solicited, and a target address is an IP address of a terminal device of which address correspondence information is solicited.

In IPv4, an address correspondence information request message includes an ARP Request message, wherein a sender address of an ARP Request message is an IP address of a terminal device which sends the ARP Request message, and a target address is an IP address of a terminal device of which address correspondence information is requested.

A generating unit 410, is used for generating, when a target address in the address correspondence information request message is the same as an IP address in a piece of existing address correspondence information in the address correspondence information table, an address correspondence information response message corresponding to the existing address correspondence information, send the address correspondence information response message corresponding to the existing address correspondence information to a terminal device which sends the address correspondence information request message, and update a MAC table according to the existing address correspondence information.

When a network node receives an address correspondence information request message on a local link, if a target IP address in the address correspondence information request message is the same as an IP address in a piece of existing address correspondence information in the address correspondence information table, the network node does not need to forward the address correspondence information request message to the network side. The generating unit 410 generates an address correspondence information response message corresponding to the existing address correspondence information, and sends the response message to a terminal device which sends the request message.

In IPv6, the address correspondence response message includes an NA message, wherein a source address of the NA message is an IP address of existing neighbor cache information in a neighbor cache information table, a destination address is a source address of a corresponding NS message, a target address is a target address of a corresponding NS message, a target link layer address is a MAC address of the existing neighbor cache information in the neighbor cache information table, and a solicited flag is set to 1.

In IPv4, the address correspondence information response message includes an ARP Reply message, wherein a sender address of the ARP Reply message is an IP address of existing ARP information in an ARP information table, a target address is a target address of a corresponding ARP Request message, and a target link layer address is a MAC address of existing ARP information in an ARP information table.

Since an edge network node closes a MAC address learning function of a network side, a corresponding item is needed to be added to a MAC table at a proper time to ensure the correct forwarding of a message. Since a terminal device sending an address correspondence information request message indicates that the terminal device probably needs to communicate with a requested terminal device next, the generating unit 410, at this moment, updates the MAC table according to the existing address correspondence information. In a data link layer protocol of applying link state routing, the MAC table of the network node corresponds to an item storing correspondence of a MAC address and a device identification of the network node, as a result, it is only needed to add the corresponding contents in an item of the address correspondence information to the MAC table.

Under some situations, a terminal device might perform a communication of data messages directly instead of sending a message on address correspondence information. At this moment, in order to avoid that a MAC table cannot be updated when MAC address learning is off, the above-mentioned updating apparatus may further comprise the following units.

A MAC adding unit, is used for adding, when a network node which receives a data message cannot find a corresponding item in a MAC table, if there is a corresponding item in an address correspondence information table, corresponding contents in the item to the MAC table.

A broadcasting unit, is used for generating, when a network node which receives a data message can not find a corresponding item in a MAC table, if there is no corresponding item in an address correspondence information table, an address correspondence information request message, encapsulates and then broadcasts the address correspondence information request message. Another network node broadcasts the address correspondence information request message on a corresponding local link after receiving the message. A requested terminal device sends an address correspondence information response message. An ingress network node of the requested terminal device encapsulates the message and then sends it to the network node which receives the data message. The network node which receives the data message updates, according to the address correspondence information response message, an address correspondence information table and a MAC table. At the same time, the ingress network node of the requested terminal device generates a corresponding address correspondence information advertisement message according to the address correspondence information response message, encapsulates the message and then broadcasts the message. A network node which receives the broadcasted message continues to process it according to the method in the above-mentioned embodiment.

For an ARP information table or a neighbor cache information table, it is generally controlled and accessed by a CPU and is stored in a memory, its access and lookup speed is relatively slow, and there is not clear restriction to the specification, while for a MAC table, it is generally controlled and accessed by an ASIC, a FPGA or an NP and is stored in a content addressable memory CAM, its access and lookup speed is fast, but its cost and power consumption is high and there are some restrictions to the specification.

Since a MAC address learning function of a network side is closed, an address correspondence advertisement message, an address correspondence information request message or an address correspondence response message of the network side does not make an edge network node learn MAC address and a device identification of an ingress network node is included in the address correspondence information, a MAC table may be updated directly according to existing address correspondence information when an address correspondence information request is received, thereby reducing a MAC table of an edge network node, and reducing the complexity of a device and lowering the requirements to the specifications of the MAC table while guaranteeing the correct forwarding of a message.

Additionally, since besides the ingress network node, other network nodes also store address correspondence information in their address correspondence information tables, so when they receive an address correspondence information request, they may directly reply with an address correspondence information response without broadcasting the request, decreasing the bandwidth occupied by broadcasting address correspondence information request in a data link layer of applying link state routing.

Combined with FIG. 5, a concrete application scenario of an embodiment of the present invention is illustrated below.

Figure 5:
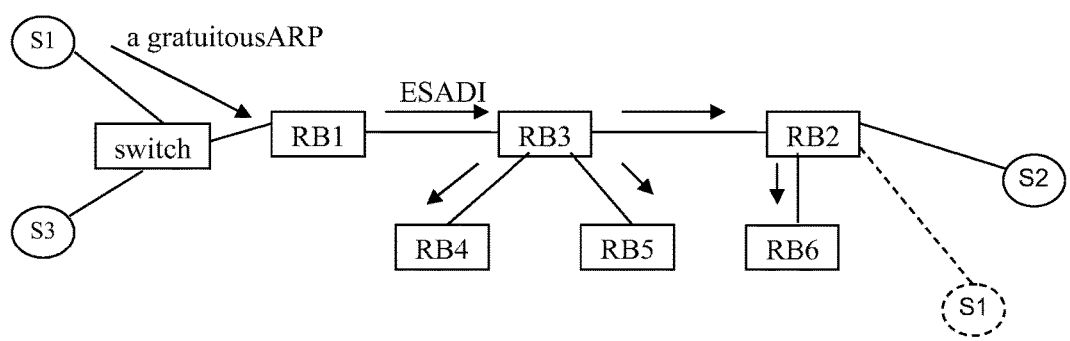
FIG. 5 is a schematic drawing of sending address correspondence information in a specific application scenario of the embodiments of the present invention.

FIG. 5 is a schematic drawing of sending address correspondence information in a concrete application scenario of an embodiment of the present invention.

The concrete application scenario is applied to TRILL based IPv4 network. RB1 to RB6 are routing bridge devices, RB1 is a routing bridge device of S1 and S3, and RB2 is a routing bridge device of S2.

RB1 obtains first ARP information after receiving a gratuitous ARP message sent by S1, i.e. a correspondence between a MAC address of S1, an IP address of S1 and RB1's own nickname. When RB1 finds that the correspondence is not in an ARP information table, it records the correspondence in the ARP information table. RB1 generates an ESADI message according to the correspondence, fills in corresponding TLV of the ESADI message according to MAC and IP addresses of S1, takes RB1's own nickname as an ingress routing bridge nickname, and broadcasts the ESADI message. All of the RB2 to RB6 receive the message, and obtain the first ARP information according to the MAC and IP addresses in the corresponding TLV as well as the ingress routing bridge nickname. When each of the routing bridge devices finds that the first ARP information is not in the ARP information table thereof, they record the first ARP information in their respective ARP information tables.

When S2 needs to communicate with S1, it sends an ARP Request message. When RB2 receives the ARP Request message and then finds that a target IP address in the ARP Request has a corresponding item in an ARP information table thereof, it generates a corresponding ARP Reply message and sends the ARP Reply message to S2. RB2 writes the MAC address of S1 and the nickname of RB1 of the corresponding item in the ARP information table thereof in a MAC table.

Suppose that S1 migrates to be under RB2 after this (position of dotted line in the figure). S1 sends a gratuitous message, and after receiving the gratuitous ARP message sent by S1, RB2 obtains first ARP information, i.e. a correspondence between a MAC address of S1, an IP address of S1 and RB2's own nickname. RB2 records the correspondence in an ARP information table when finding the correspondence is not in the ARP information table. Specifically, when both of MAC and IP addresses of S1 are not changed and a device identification in existing ARP information, i.e. a nickname of RB1, is different from RB2's own device identification, it may be assumed that S1 makes a migration and its routing bridge device before the migration, i.e. RB1, is not this routing bridge device. Since RB2 has performed MAC address learning on the gratuitous ARP message which is sent by S1, it does not need to check and update a MAC table at this moment.

RB2 generates an ESADI message according to the first ARP information, fills in corresponding TLV of the ESADI message according to MAC and IP addresses of S1, takes RB2's own nickname as an ingress routing bridge nickname, and broadcasts the ESADI message. All of the RB1 and RB3 to RB6 receive the message, and obtain the first ARP information according to MAC and IP addresses in the corresponding TLV as well as the ingress routing bridge nickname.

For RB3 to RB6, an IP address in the first ARP information is the same as an IP address in a piece of existing ARP information in the ARP information tables of RB3 to RB6, a MAC address in the first ARP information is the same as a MAC address in the existing ARP information in RB3 to RB6, and a device identification in the existing ARP information, i.e. a nickname of RB1, is different from nicknames of RB3 to RB6, so RB3 to RB6 update their respective existing ARP information. If a terminal device under RB4 has tried to communicate with S1, there would be a corresponding MAC item in the MAC table thereof, and the MAC item is also needed to be updated. At this moment, there is no need for RB4 to advertise in local that the terminal device makes a migration, as for a local terminal device of RB4, regardless of whether S1 makes a migration or not, it only needs to send a message to RB4 when communicating with S1 and subsequent process is finished by RB4. Information of a local terminal device regarding S1, such as an IP address, a MAC address, a sending port and so on, is not changed.

For RB1, an IP address in the first ARP information is the same as an IP address in a piece of existing ARP information in an ARP information table of RB1, a MAC address in the first ARP information is the same as a MAC address in the existing ARP information in RB1, and a device identification in the existing ARP information, i.e. a nickname of RB1, is the same as a device identification of RB1, i.e. a nickname of RB1, as a result, RB1 updates the existing ARP information. Since when S1 is online at RB1, RB1 has performed MAC address learning to the gratuitous message of S1, a MAC table is also needed to be updated. RB1 generates a gratuitous ARP message corresponding to the first ARP information and broadcasts the gratuitous ARP message on a local link of a VLAN corresponding to the ESADI message. If there was a switch (switch) between S1 and RB1, and S3 which was under RB1 together with S1 is also under the switch, the switch has obtained information on S1 according to the gratuitous ARP message broadcasted by RB1 when S1 was online at RB1, and if the switch does not know that S1 has migrated, the switch would forward a received message which is sent from S3 to S1 to a port where S1 originally lay instead of sending it to RB when S3 needs to communicate with S1. As a result, RB1 needs to broadcast the gratuitous message corresponding to the first ARP information so as to update ARP and MAC information regarding S1 of terminal devices on a local link, such as S3.

All of RB1 to RB6 perform an aging detection to a terminal device on the local link. When S1 is offline, RB2 finds that ARP and MAC information of S1 is needed to be aged. RB2 ages the ARP information, and further delete a corresponding item in a MAC table. RB2 broadcasts an ESADI message that information on S1 needs to be aged, and RB1 and RB3 to RB6 age ARP information on S1 and further delete corresponding items in MAC tables, respectively.

Through the description of the above embodiments, those skilled in the art may understand clearly that the present invention may be implemented by means of software and necessary hardware platforms, or may be implemented just by hardware, while the former is a better implementation at most cases. Based on this understanding, all or part of technical solution of the present invention which makes contribution to the background technologies may be embodied in a form of a software product, wherein the software product may be used to execute the processes of above-mentioned methods. The computer software product may be stored in a storage medium, such as an ROM/RAM, a disk, a CD and so on, which includes several instructions that enable a computer device (it may be a personal computer, a server, a network device and so on) to execute the methods described in the respective embodiments or in some part of an embodiment of the present invention.

The foregoing is only preferred embodiments of the present invention, the protection scope of the present invention, however, is not limited to the above description. Any alteration or substitution that can be easily occurring to those skilled in the art within the technical scope disclosed by the present invention should fall in the protection scope of the present invention. Therefore, the protection scope of the present invention should be defined by that of the claims.

What is claimed is:

1. A method performed by a first RBridge for sending address correspondence information in a Transparent Interconnect of Lots of Links (TRILL) network, comprising:

receiving an address correspondence advertisement message sent by a first terminal device on a local link of the first RBridge;

obtaining first address correspondence information according to the address correspondence advertisement message, wherein the first address correspondence information comprises a correspondence of: a Medium Access Control (MAC) address of the first terminal device, an Internet Protocol (IP) address of the first terminal device and a Nickname of the first RBridge, wherein the Nickname of the first RBridge is 16-bit dynamically assigned digit and is used as abbreviation for an Intermediate system to intermediate system (IS-IS) identification of the first RBridge;

recording the first address correspondence information in an address correspondence information table of the first RBridge, when the first address correspondence information is not in the address correspondence information table of the first RBridge; and sending the first address correspondence information to a second RBridge through a first End Station Address Distribution Information (ESADI) message, wherein a type-length-value (TLV) of a payload of the first ESADI message comprises the MAC address of the first terminal device and the IP address of the first terminal device, and a message header of the first ESADI message comprises the Nickname of the first RBridge.

2. The method according to claim 1, further comprising:

performing an aging detection on the first terminal device on the local link of the first RBridge; and sending an aging indication and the first address correspondence information to the second RBridge through a second ESADI message when it is determined that the first address correspondence information needs to be aged, wherein the aging indication indicates the second RBridge aging the first address correspondence information in its address correspondence information table.

3. The method according to claim 1, wherein recording the first address correspondence information in the address correspondence information table of the first RBridge comprises:

adding the first address correspondence information to the address correspondence information table of the first RBridge, when the IP address in the first address correspondence information is different from an IP address of any address correspondence information in the address correspondence information table of the first RBridge; and updating an existing address correspondence information in the address correspondence information table of the first RBridge with the first address correspondence information, when the IP address in the first address correspondence information is the same as an IP address in the existing address correspondence information, the MAC address in the first address correspondence information is the same as an MAC address in the existing address correspondence information, and the Nickname in the first address correspondence information is different from a Nickname in the existing address correspondence information.

4. The method according to claim 1, further comprising:

receiving an address correspondence information request message sent by a second terminal device on the local link of the first RBridge; and when a target address in the address correspondence information request message is the same as an IP address in an existing address correspondence information in the address correspondence information table of the first RBridge, updating an MAC table of the first RBridge according to the existing address correspondence information, generating an address correspondence information response message corresponding to the existing address correspondence information, and sending the address correspondence information response message to the second terminal device.

5. The method according to claim 1, further comprising:

receiving a third address correspondence information sent by the second RBridge through a second ESADI message; and adding the third address correspondence information in the address correspondence information table of the first RBridge, when an IP address in the third address correspondence information is different from an IP address in any address correspondence information in the address correspondence information table of the first RBridge.

6. The method according to claim 5 wherein, when the IP address in the third address correspondence information is the same as an IP addresses in an existing address correspondence information in the address correspondence information table of the first RBridge, a MAC address in the third address correspondence information is the same as a MAC addresses in the existing address correspondence information, and a Nickname in the existing address correspondence information is different from the Nickname of the first RBridge, the method further comprises:

updating the existing address correspondence information with the third address correspondence information if the MAC addresses in the existing address correspondence information is different from an MAC address in any MAC item in the MAC table of the first RBridge; or updating the existing address correspondence information and the existing MAC item with the third address correspondence information if the MAC addresses in the existing address correspondence information is the same as a MAC address in an existing MAC item in the MAC table of the first RBridge.

7. A method performed by a first RBridge for updating Medium Access Control (MAC) table in a Transparent Interconnect of Lots of Links (TRILL) network, the method comprising:

closing MAC address learning function of a network side of the first RBridge;

receiving an address correspondence advertisement message, wherein the address correspondence advertisement message is an End Station Address Distribution Information (ESADI) message, a type-length-value (TLV) of a payload of the ESADI message comprises a MAC address of a first terminal device and an Internet Protocol (IP) address of the first terminal device, and a message header of the ESADI message comprises a Nickname of a second RBridge that encapsulates the address correspondence advertisement message, wherein the Nickname of the second RBridge is 16-bit dynamically assigned digit and is used as abbreviation for an Intermediate system to intermediate system (IS-IS) identification of the second RBridge;

obtaining first address correspondence information according to the address correspondence advertisement message, wherein the first address correspondence information comprises a correspondence among the MAC address of the first terminal device, the IP address of the first terminal device and the Nickname of the second RBridge;

adding the first address correspondence information to an address correspondence information table of the first RBridge, when the IP address in the first address correspondence information is different from an IP address in any address correspondence information in the address correspondence information table of the first RBridge;

receiving an address correspondence information request message sent by a second terminal device on a local link of the first RBridge; and when a target address in the address correspondence information request message is the same as an IP address in an existing address correspondence information in the address correspondence information table of the first RBridge, updating a MAC table of the first RBridge according to the existing address correspondence information.

8. The method according to claim 7, further comprising:
generating an address correspondence information response message corresponding to the existing address correspondence information; and
sending the address correspondence information response message to the second terminal device.

9. The method according to claim 7 wherein, when the IP address in the first address correspondence information is the same as an IP addresses in an existing address correspondence information in the address correspondence information table of the first RBridge, a MAC address in the first address correspondence information is the same as a MAC addresses in the existing address correspondence information, and the device identification in the first address correspondence information is different from a device identification in the existing address correspondence information, the method further comprises:
updating the existing address correspondence information with the first address correspondence information if the MAC addresses in the existing address correspondence information is different from an MAC address in any MAC item in the MAC table of the first RBridge; or
updating the existing address correspondence information and the existing MAC item with the first address correspondence information if the MAC addresses in the existing address correspondence information is the same as a MAC address in an existing MAC item in the MAC table of the first RBridge.

10. A first RBridge in a Transparent Interconnect of Lots of Links (TRILL) network, comprising:
a processor and a memory storing instructions, the processor being configured to execute the instructions to perform operations of:
receiving an address correspondence advertisement message sent by a first terminal device on a local link of the first RBridge;
obtaining first address correspondence information according to the address correspondence advertisement message, wherein the first address correspondence information comprises a correspondence of: a Media Access Control (MAC) address of the first terminal device, an Internet Protocol (IP) address of the first terminal device and a Nickname of the first RBridge, wherein the Nickname of the first RBridge is 16-bit dynamically assigned digit and is used as abbreviation for an Intermediate system to intermediate system (IS-IS) identification of the first RBridge;

recording the first address correspondence information in an address correspondence information table of the first RBridge, when the first address correspondence information is not in the address correspondence information table of the first RBridge; and sending the first address correspondence information to a second RBridge through a first End Station Address Distribution Information (ESADI) message, wherein a type-length-value (TLV) of a payload of the first ESADI message comprises the IP address of the first terminal device and the MAC address of the first terminal device; a message header of the first ESADI message comprises the Nickname of the first RBridge.

11. The first RBridge according to claim 10, the processor further performs:
performing an aging detection on the first terminal device; and
sending an aging indication and the first address correspondence information to the second RBridge through a second ESADI message when it is determined that the first address correspondence information needs to be aged, wherein the aging indication indicates the second RBridge aging the first address correspondence information in its address correspondence information table.

12. The first RBridge according to claim 10, wherein said recording the first address correspondence information in the address correspondence information table of the first RBridge comprises:
adding the first address correspondence information to the address correspondence information table of the first RBridge, when the IP address in the first address correspondence information is different from an IP address in any address correspondence information in the address correspondence information table of the first RBridge; and
updating an existing address correspondence information in the address correspondence information table of the first RBridge with the first address correspondence information, when the IP address in the first address correspondence information is the same as an IP address in the existing address correspondence information, the MAC address in the first address correspondence information is the same as an MAC address in the existing address correspondence information, and the Nickname in the first address correspondence information is different from a Nickname in the existing address correspondence information.

13. The first RBridge according to claim 10, the processor further performs:
receiving an address correspondence information request message sent by a second terminal device on the local link of the first RBridge; and
when a target address in the address correspondence information request message is the same as an IP address in an existing address correspondence information in the address correspondence information table of the first RBridge, updating an MAC table of the first RBridge according to the existing address correspondence information, generating an address correspondence information response message corresponding to the existing address correspondence information, and sending the address correspondence information response message to the second terminal device.

14. The first RBridge according to claim 10, the processor further performs:
receiving a third address correspondence information sent by the second RBridge through a second ESADI message; and
adding the third address correspondence information in the address correspondence information table of the first RBridge, when an IP address in the third address correspondence information is different from an IP address in any address correspondence information in the address correspondence information table of the first RBridge.

15. The first RBridge according to claim 14 wherein, when the IP address in the third address correspondence information is the same as an IP addresses in an existing address correspondence information in the address correspondence information table of the first RBridge, a MAC address in the third address correspondence information is the same as a MAC addresses in the existing address correspondence information, and a Nickname in the existing address correspondence information is different from the Nickname of the first RBridge, the processor further performs:
updating the existing address correspondence information with the third address correspondence information if the MAC addresses in the existing address correspondence information is different from a MAC address in any MAC item in the MAC table of the first RBridge; or
updating the existing address correspondence information and the existing MAC item with the third address correspondence information if the MAC addresses in the existing address correspondence information is the same as a MAC address in an existing MAC item in the MAC table of the first RBridge.

16. A first RBridge in a Transparent Interconnect of Lots of Links (TRILL) network, wherein Media Access Control (MAC) address learning function of a network side of the first RBridge is in a closing state, and the first RBridge comprises:
a processor and a memory storing instructions, the processor being configured to execute the instructions to perform operations of:
receiving an address correspondence advertisement message, wherein the address correspondence advertisement message is an End Station Address Distribution Information (ESADI) message, wherein a type-length-value (TLV) of a payload of the ESADI message comprises a MAC address of a first terminal device and an Internet Protocol (IP) address of the first terminal device, and a message header of the ESADI message comprises a Nickname of a second RBridge that encapsulates the address correspondence advertisement message, wherein the Nickname of the second RBridge is 16-bit dynamically assigned digit and is used as abbreviation for an Intermediate system to intermediate system (IS-IS) identification of the second RBridge;
obtaining first address correspondence information according to the address correspondence advertisement message, wherein the first address correspondence information comprises a correspondence among the MAC address of the first terminal device, the IP address of the first terminal device, and the Nickname of the second RBridge;
adding the first address correspondence information to an address correspondence information table of the first RBridge, when the IP address in the first address correspondence information is different from an IP address in any address correspondence information in the address correspondence information table of the first RBridge;
receiving an address correspondence information request message sent by a second terminal device on a local link of the first RBridge; and
when a target address in the address correspondence information request message is the same as an IP address in an existing address correspondence information in the address correspondence information table of the first RBridge, updating a MAC table of the first RBridge according to the existing address correspondence information.

17. The first RBridge according to claim 16, the processor further performs:
generating an address correspondence information response message corresponding to the existing address correspondence information; and
sending the address correspondence information response message to the second terminal device.

18. The first RBridge according to claim 16 wherein, when the IP address in the first address correspondence information is the same as an IP addresses in an existing address correspondence information in the address correspondence information table of the first RBridge, a MAC address in the first address correspondence information is the same as a MAC addresses in the existing address correspondence information, and the Nickname in the first address correspondence information is different from a Nickname in the existing address correspondence information, the processor further performs:
updating the existing address correspondence information with the first address correspondence information if the MAC addresses in the existing address correspondence information is different from a MAC address in any MAC item in the MAC table of the first RBridge; or
updating the existing address correspondence information and the existing MAC item with the first address correspondence information if the MAC addresses in the existing address correspondence information is the same as a MAC address in an existing MAC item in the MAC table of the first RBridge.

* * * * *